United States Patent
Lee et al.

(10) Patent No.: US 11,601,992 B2
(45) Date of Patent: Mar. 7, 2023

(54) METHOD OF ACCESSING NETWORK BASED ON ACCESS TECHNOLOGY AND ELECTRONIC DEVICE THEREFOR

(71) Applicant: Samsung Electronics Co., Ltd., Suwon-si (KR)

(72) Inventors: Soomin Lee, Suwon-si (KR); Junsuk Kim, Suwon-si (KR); Jihwan Kim, Suwon-si (KR); Kyunghoon Lee, Suwon-si (KR); Chungwan Hong, Suwon-si (KR); Hyejeong Kim, Suwon-si (KR); Sangho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 17/470,406

(22) Filed: Sep. 9, 2021

(65) Prior Publication Data
US 2021/0410210 A1    Dec. 30, 2021

Related U.S. Application Data

(63) Continuation of application No. 16/872,821, filed on May 12, 2020, now Pat. No. 11,147,110.

(30) Foreign Application Priority Data

May 21, 2019    (KR) .................. 10-2019-0059631

(51) Int. Cl.
*H04W 76/11*    (2018.01)
*H04W 72/04*    (2009.01)
(Continued)

(52) U.S. Cl.
CPC .............. *H04W 76/11* (2018.02); *H04W 8/20* (2013.01); *H04W 72/0453* (2013.01); *H04W 72/10* (2013.01); *H04W 84/042* (2013.01)

(58) Field of Classification Search
CPC ... H04W 76/11; H04W 8/20; H04W 72/0453; H04W 72/10; H04W 84/04
See application file for complete search history.

(56) References Cited

U.S. PATENT DOCUMENTS

| 7,899,939 B2 | 3/2011 | Carpenter et al. |
| 8,855,636 B2 | 10/2014 | Balasubramanian et al. |

(Continued)

FOREIGN PATENT DOCUMENTS

KR    10-2016-0134439 A    11/2016

OTHER PUBLICATIONS

Samsung, Further considerations on the CN selection for E-UTRAN connected to 5G CN, R2-1802112, revision of R2-1712171, 3GPP TSG-RAN WG2 Meeting #101, Athens, Greece, Feb. 15, 2018.
(Continued)

*Primary Examiner* — Joshua L Schwartz
(74) *Attorney, Agent, or Firm* — Jefferson IP Law, LLP

(57) ABSTRACT

An electronic device is provided. The electronic device includes a first wireless communication circuit that provides a first radio access technology (RAT) associated with a long term evolution (LTE), a second wireless communication circuit that provides a second RAT associated with a new radio (NR), a subscriber identification module, a communication processor, and a memory. The electronic device obtains access technology identifier (ATI) information associated with one public land mobile network (PLMN) from the subscriber identification module and performs frequency scanning by using the first wireless communication circuit, when the ATI information indicates a next generation radio access network (NG-RAN) associated with the first RAT.

20 Claims, 16 Drawing Sheets

(51) Int. Cl.
  *H04W 72/10* (2009.01)
  *H04W 84/04* (2009.01)
  *H04W 8/20* (2009.01)
  *H04W 72/0453* (2023.01)

(56) References Cited

U.S. PATENT DOCUMENTS

| | | | |
|---|---|---|---|
| 8,934,334 B2 | 1/2015 | Kim et al. | |
| 9,699,719 B2 | 7/2017 | Ni et al. | |
| 9,713,055 B2 | 7/2017 | Kim et al. | |
| 9,942,816 B2 | 4/2018 | Wirtanen et al. | |
| 10,165,485 B2 | 12/2018 | Wirtanen et al. | |
| 10,374,960 B2 | 8/2019 | Zhang et al. | |
| 10,499,323 B2 * | 12/2019 | Kwok | H04W 16/14 |
| 10,512,013 B2 | 12/2019 | Kim et al. | |
| 10,602,432 B2 | 3/2020 | Kim et al. | |
| 10,887,828 B2 | 1/2021 | Lee et al. | |
| 10,980,075 B2 * | 4/2021 | Willars | H04W 76/15 |
| 10,986,565 B2 | 4/2021 | Kim et al. | |
| 2008/0261655 A1 * | 10/2008 | Carpenter | H04W 48/18 455/558 |
| 2010/0099412 A1 * | 4/2010 | Ramachandran | H04W 48/18 455/435.2 |
| 2014/0128070 A1 | 5/2014 | Ni et al. | |
| 2015/0140998 A1 | 5/2015 | Kim et al. | |
| 2015/0245286 A1 | 8/2015 | Ni et al. | |
| 2016/0157150 A1 | 6/2016 | Wirtanen et al. | |
| 2017/0346746 A1 * | 11/2017 | Zhang | H04W 48/18 |
| 2018/0152872 A1 * | 5/2018 | Wirtanen | H04W 72/048 |
| 2019/0069226 A1 | 2/2019 | Lee et al. | |
| 2021/0235364 A1 | 7/2021 | Kim et al. | |

OTHER PUBLICATIONS

Vivo, Remaining coding details of PLMN list, R2-1807621, revision of R2-1804886, 3GPP TSG-RAN WG2 Meeting #102, Busan, Korea, May 20, 2018.
Extended European Search Report dated May 11, 2022, issued in European Patent Application No. 20810069.3.
Nokia et al., 'RAT identifiers for PLMN selection in 5G', S1-173251, 3GPP, Aug. 28, 2017.
International Search Report dated Sep. 3, 2020, issued in International Patent Application No. PCT/KR2020/006521.

* cited by examiner

METHOD OF ACCESSING NETWORK BASED ON ACCESS TECHNOLOGY AND ELECTRONIC DEVICE THEREFOR

CROSS-REFERENCE TO RELATED APPLICATION(S)

This application is a continuation application of prior application Ser. No. 16/872,821, filed on May 12, 2020, which application is based on and claims priority under 35 U.S.C. § 119 of a Korean patent application number 10-2019-0059631, filed on May 21, 2019, in the Korean Intellectual Property Office, the disclosure of which is incorporated by reference herein in its entirety.

BACKGROUND

1. Field

The disclosure relates to a network access method based on an access technology and an electronic device therefor.

2. Description of Related Art

The 5th generation (5G) mobile communication is developed to satisfy an increase in data traffic after the deployment of a 4th generation (4G) mobile communication network. The 5G mobile communication may support a radio access technology (RAT) different from that of the 4G mobile communication. According to a 5G mobile communication deployment scenario, the access to a 5G mobile communication network based on the 4G mobile communication may be supported. For example, an electronic device may be simultaneously connected to a plurality of cells associated with different RATs.

The electronic device may perform public land mobile network (PLMN) selection for cell selection. The electronic device may perform the PLMN selection in compliance with the standard defined in the 3rd generation partnership project (3GPP) technical specification (TS) 23.122. For example, the electronic device may perform the PLMN selection by using a home PLMN (HPLMN) and/or an equivalent HPLMN (EHPLMN), in compliance with the specified rule. For example, the electronic device may perform the PLMN selection by using priority information about a combination of each PLMN and an access technology (AcT) of the corresponding PLMN. The electronic device may perform cell search by using the selected PLMN.

In the 5G mobile communication, various types of radio access networks (RANs) and various types of core networks may be combined. For example, heterogeneous core networks (e.g., an evolved packet core (EPC) and a 5th generation core (5GC)) may be connected to one long term evolution (LTE) cell or a 5th generation (5G) cell. For another example, an access technology (e.g., an evolved universal mobile telecommunications system (UMTS) terrestrial radio access (E-UTRA) or a new radio (NR)) of the RAN and an access technology of the core network may be different.

An electronic device may select a PLMN by using a priority according to a combination of the PLMN and the access technology. In this case, the electronic device may try to register on a core network connected to a cell corresponding to the corresponding access technology. In the case where the radio access technology of the cell and the access technology of the core network are different, the electronic device may try to register on a core network that uses an access technology different from a preferred access technology of the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Accordingly, an aspect of the disclosure is to provide an electronic device that includes a first wireless communication circuit that provides a first radio access technology (RAT) associated with a long term evolution (LTE), a second wireless communication circuit that provides a second RAT associated with a new radio (NR), a subscriber identification module, a communication processor that is operatively connected with the first wireless communication circuit, the second wireless communication circuit, and the subscriber identification module, and a memory that is operatively connected with the communication processor. The memory stores one or more instructions that, when executed, cause the communication processor to obtain access technology identifier (ATI) information associated with one public land mobile network (PLMN) from the subscriber identification module and to perform frequency scanning by using the first wireless communication circuit, based on the ATI information indicating a next generation radio access network (NG-RAN) associated with the first RAT.

In accordance with another aspect of the disclosure, a frequency scanning method of an electronic device is provided. The method includes obtaining access technology identifier (ATI) information associated with one public land mobile network (PLMN) from a subscriber identification module of the electronic device, and performing frequency scanning by using a first wireless communication circuit configured to provide a first radio access technology (RAT) associated with a long term evolution (LTE), based on the ATI information indicating a next generation radio access network (NG-RAN) associated with the first RAT.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
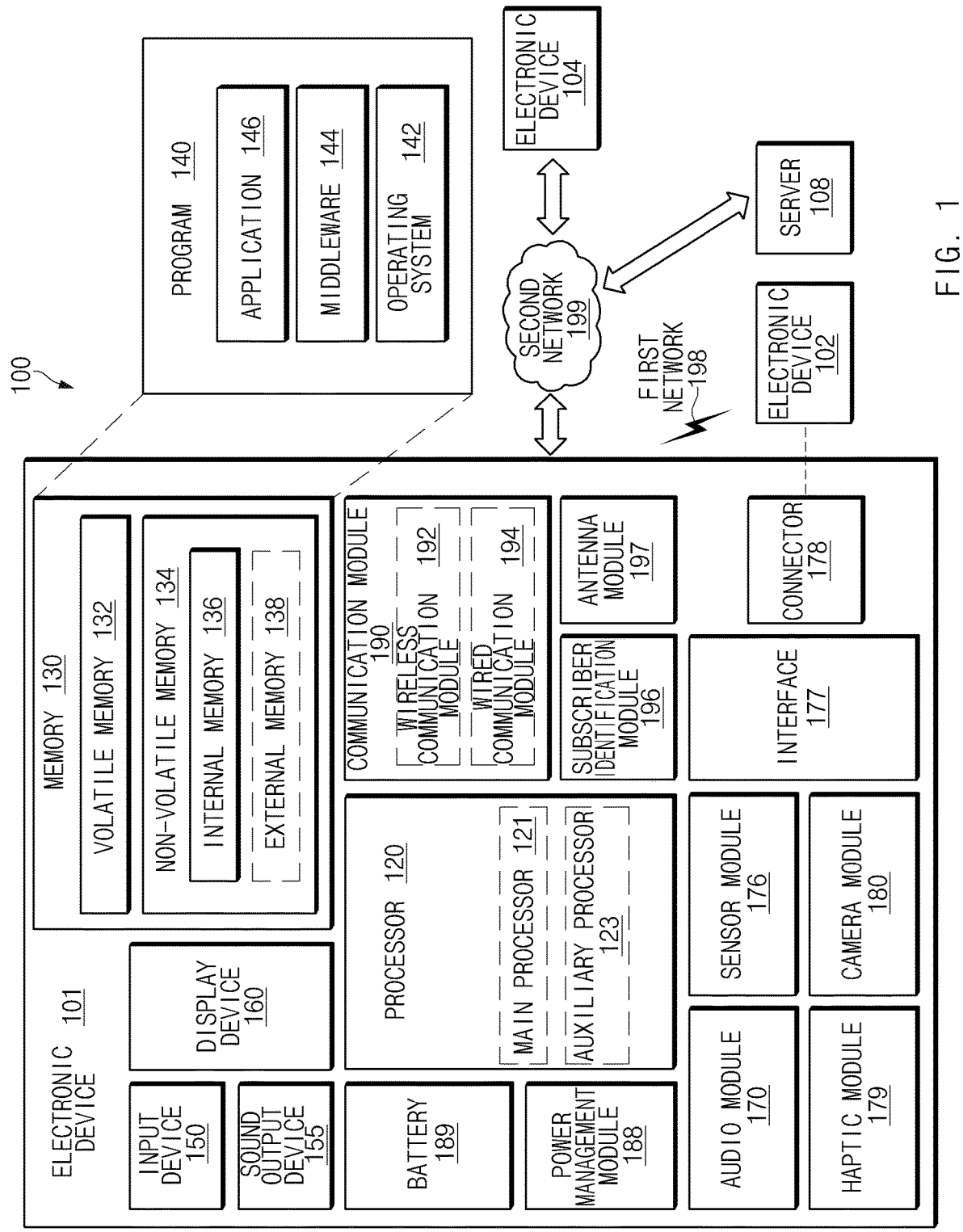
FIG. 1 illustrates a block diagram of an electronic device, according to an embodiment of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
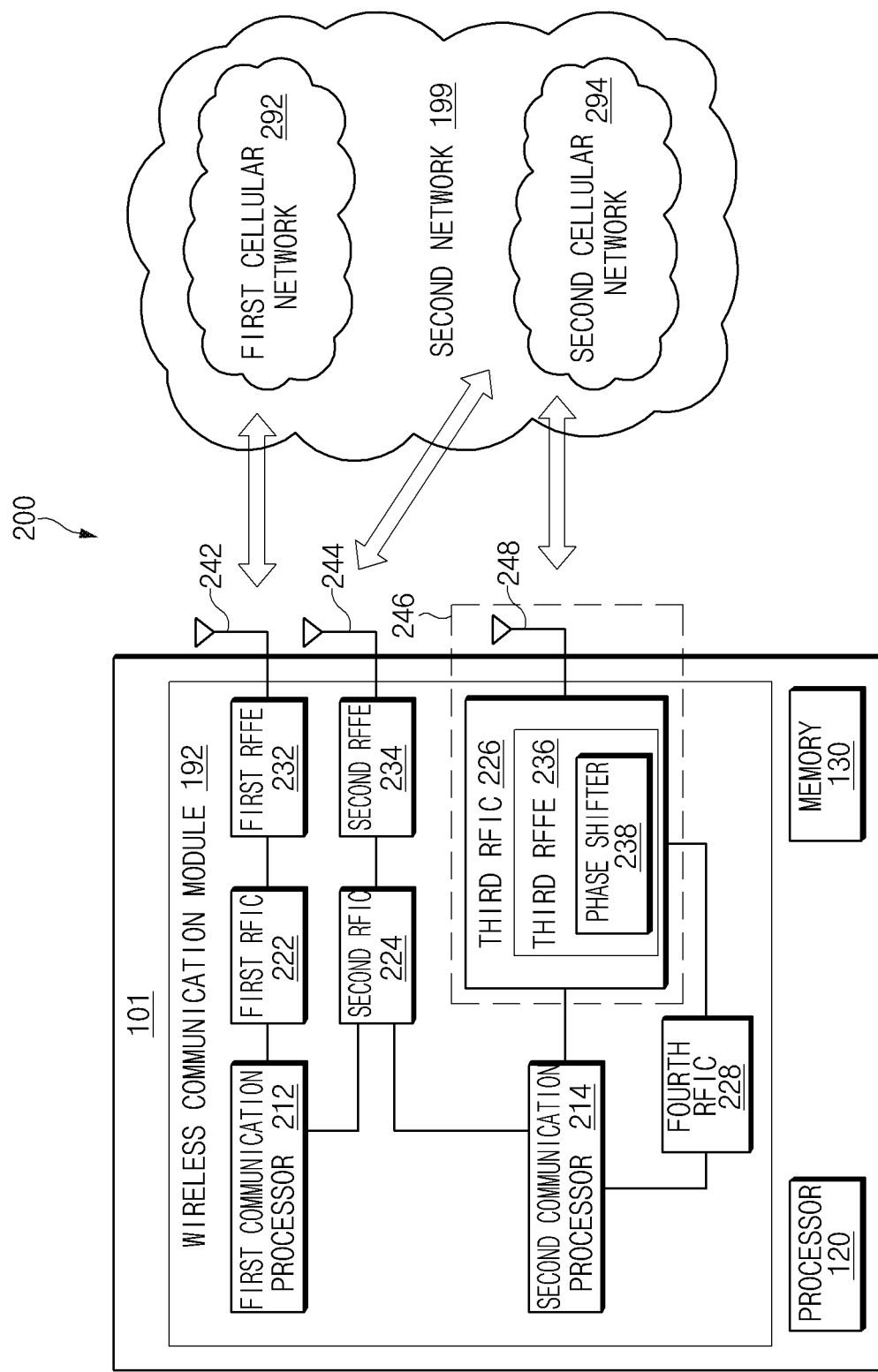
FIG. 2 is a block diagram of an electronic device for supporting legacy network communication and $5^{th}$ generation (5G) network communication according to an embodiment of the disclosure.

FIG. 2 is a block diagram 200 of the electronic device 101 for supporting legacy network communication and 5G network communication, according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one component of the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may establish a communication channel of a band to be used for wireless communication with the first cellular network 292 and may support legacy network communication over the established communication channel. According to various embodiments, the first cellular network 292 may be a legacy network including a 2G network, a 3G network, a 4G network, and/or a long term evolution (LTE) network. The second communication processor 214 may establish a communication channel corresponding to a specified band (e.g., approximately 6 GHz to approximately 60 GHz) of bands to be used for wireless communication with the second network 294 and may support the 5G network communication over the established communication channel. According to various embodiments, the second cellular network 294 may be a 5G network defined in the 3GPP. Additionally, according to an embodiment, the first communication processor 212 or the second communication processor 214 may establish a communication channel corresponding to another specified band (e.g., approximately 6 GHz or lower) of the bands to be used for wireless communication with the second network 294 and may support the 5G network communication over the established communication channel. According to an embodiment, the first communication processor 212 and the second communication processor 214 may be implemented in a single chip or a single package. According to various embodiments, the first communication processor 212 or the second communication processor 214 may be implemented in a single chip or a single package together with the processor 120, the auxiliary processor 123 of FIG. 1, or the communication module 190 (e.g., a transceiver) of FIG. 1.

In the case of transmitting a signal, the first RFIC 222 may convert a baseband signal generated by the first communication processor 212 into a radio frequency (RF) signal of approximately 700 MHz to approximately 3 GHz that is used in the first cellular network 292 (e.g., a legacy network). In the case of receiving a signal, an RF signal may be obtained from the first cellular network 292 (e.g., a legacy network) through an antenna (e.g., the first antenna module 242) and may be pre-processed through an RFFE (e.g., the first RFFE 232). The first RFIC 222 may convert the pre-processed RF signal into a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., approximately 6 GHz or lower) used in the second cellular network 294 (e.g., a 5G network). In the case of receiving a signal, a 5G Sub6 RF signal may be obtained from the second cellular network 294 (e.g., a 5G network) through an antenna (e.g., the second antenna module 244) and may be pre-processed through an RFFE (e.g., the second RFFE 234). The second RFIC 224 may convert the pre-processed 5G Sub6 RF signal into a baseband signal so as to be processed by a relevant communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., approximately 6 GHz to approximately 60 GHz) to be used in the second cellular network 294 (e.g., a 5G network). In the case of receiving a signal, a 5G Above6 RF signal may be obtained from the second cellular network 294 (e.g., a 5G network) through an antenna (e.g., the antenna 248) and may be pre-processed through a third RFFE 236. For example, the third RFFE 236 may pre-process a signal by using a phase shifter 238. The third RFIC 226 may convert the pre-processed 5G Above6 RF signal into a baseband signal so as to be processed by the second communication processor 214. According to an embodiment, the third RFFE 236 may be implemented as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal (hereinafter referred to as an "IF signal") in an intermediate frequency band (e.g., approximately 9 GHz to approximately 11 GHz) and may provide the IF signal to the third RFIC 226. The third RFIC 226 may convert the IF signal into a 5G Above6 RF signal. In the case of receiving a signal, a 5G Above6 RF signal may be received from the second cellular network 294 (e.g., a 5G network) through an antenna (e.g., the antenna 248) and may be converted into an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented with a part of a single package or a single chip. According to an embodiment, the first RFFE 232 and the second RFFE 234 may be implemented with a part of a single package or a single chip. According to an embodiment, at least one antenna module of the first antenna module 242 or the second antenna module 244 may be omitted or may be combined with any other antenna module to process RF signals in a plurality of corresponding bands.

According to an embodiment, the third RFIC 226 and the antenna 248 may be disposed at the same substrate to form a third antenna module 246. For example, the wireless communication module 192 or the processor 120 may be disposed at a first substrate (e.g., a main PCB). In this case, the third RFIC 226 may be disposed in a partial region (e.g., on a lower surface) of a second substrate (e.g., a sub-PCB) independent of the first substrate, and the antenna 248 may be disposed in another partial region (e.g., on an upper surface) of the second substrate. As such, the third antenna module 246 may be formed. According to an embodiment, the antenna 248 may include, for example, an antenna array capable of being used for beamforming. As the third RFIC 226 and the antenna 248 are disposed at the same substrate, it may be possible to decrease a length of a transmission line between the third RFIC 226 and the antenna 248. For example, the decrease in the transmission line may make it possible to prevent a signal in a high-frequency band (e.g., approximately 6 GHz to approximately 60 GHz) used for the 5G network communication from being lost (or attenuated) due to the transmission line. As such, the electronic device 101 may improve the quality or speed of communication with the second cellular network 294 (e.g., a 5G network).

The second cellular network 294 (e.g., a 5G network) may be used independently of the first cellular network 292 (e.g., a legacy network) (e.g., this scheme being called "stand-alone (SA)") or may be used in connection with the first cellular network 292 (e.g., this scheme being called "non-stand alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 212, or the second communication processor 214).

Figure 3:
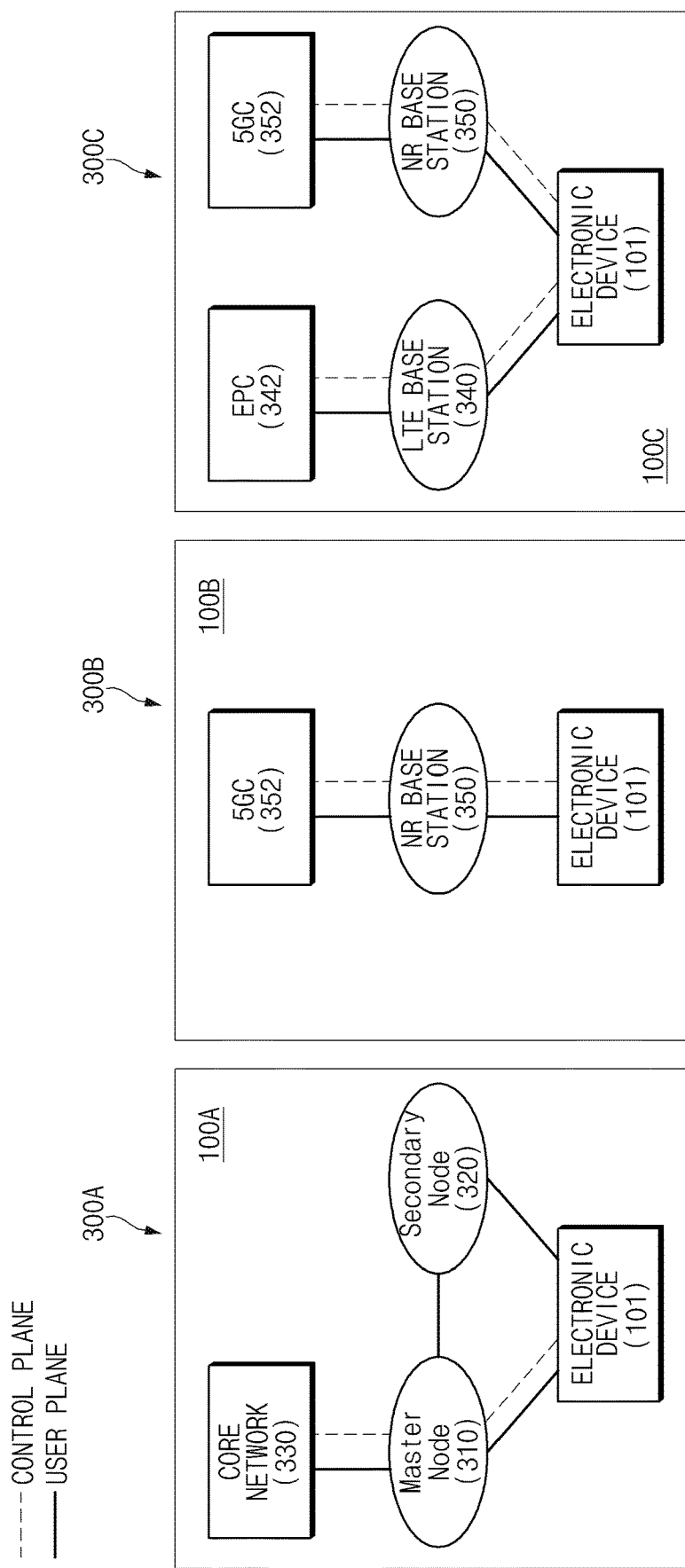
FIG. 3 illustrates wireless communication systems providing networks for legacy communication and/or 5G communication according to an embodiment of the disclosure.

FIG. 3 illustrates wireless communication systems providing networks for legacy communication and/or 5G communication according to an embodiment of the disclosure.

Referring to FIG. 3, network environments 100A, 100B, and 100C may include at least one of a legacy network and a 5G network. The legacy network may include, for example, a 4G or LTE base station 340 (e.g., eNodeB (eNB)) of the 3GPP standard supporting a radio access to the electronic device 101 and an evolved packet core (EPC) 342 managing 4G communication. The 5G network may include, for example, a New Radio (NR) base station 350 (e.g., gNodeB (gNB)) supporting a radio access to the electronic device 101 and a $5^{th}$ generation core (5GC) managing 5G communication of the electronic device 101.

According to various embodiments, the electronic device 101 may transmit/receive a control message and user data through legacy communication and/or 5G communication. The control message may include, for example, a message associated with at least one of security control, bearer setup, authentication, registration, or mobility management of the electronic device 101. The user data may mean user data except for the control message that is transmitted/received between the electronic device 101 and a core network 330 (e.g., the EPC 342).

Referring to reference numeral 300A, the electronic device 101 according to an embodiment may transmit/receive at least one of the control message and the user data with at least a part (e.g., the NR base station 350 and a 5GC 352) of the 5G network by using at least a part (e.g., the LTE base station 340 and the EPC 342) of the legacy network.

According to various embodiments, the network environment 100A may include a network environment that provides a multi-RAT (radio access technology) dual connectivity (MR-DC) to the LTE base station 340 and the NR base station 350 and transmits/receives the control message with the electronic device 101 over the core network 330 being one of the EPC 342 or the 5GC 352.

According to various embodiments, in the MR-DC environment, one base station of the LTE base station 340 or the NR base station 350 may operate as a master node (MN) 310, and the other thereof may operate as a secondary node (SN) 320. The MN 310 may be connected to the core network 330 to transmit/receive the control message. The MN 310 and the SN 320 may be connected through a network interface to exchange messages associated with a wireless resource (e.g., a communication channel) with each other.

According to various embodiments, the MN 310 may be implemented with the LTE base station 340, the SN 320 with the NR base station 350, and the core network 330 with the EPC 342. For example, it may be possible to transmit/receive the control message through the LTE base station 340 and the EPC 342 and to transmit/receive the user data through the LTE base station 340 and the NR base station 350.

Referring to reference numeral 300B, according to various embodiments, the 5G network may transmit/receive the control message and the user data independently of the electronic device 101.

Referring to reference numeral 300C, the legacy network and the 5G network according to various embodiments may provide data transmission/reception independently of each other. For example, the electronic device 101 and the EPC 342 may transmit/receive the control message and the user data through the LTE base station 340. For another example, the electronic device 101 and the 5GC 352 may transmit/receive the control message and the user data through the NR base station 350.

According to various embodiments, the electronic device 101 may be registered on at least one of the EPC 342 or the 5GC 352 to transmit/receive the control message.

According to various embodiments, the EPC 342 and the 5GC 352 may interwork to manage communication of the electronic device 101. For example, movement information of the electronic device 101 may be transmitted/received through an interface between the EPC 342 and the 5GC 352.

Figure 4:
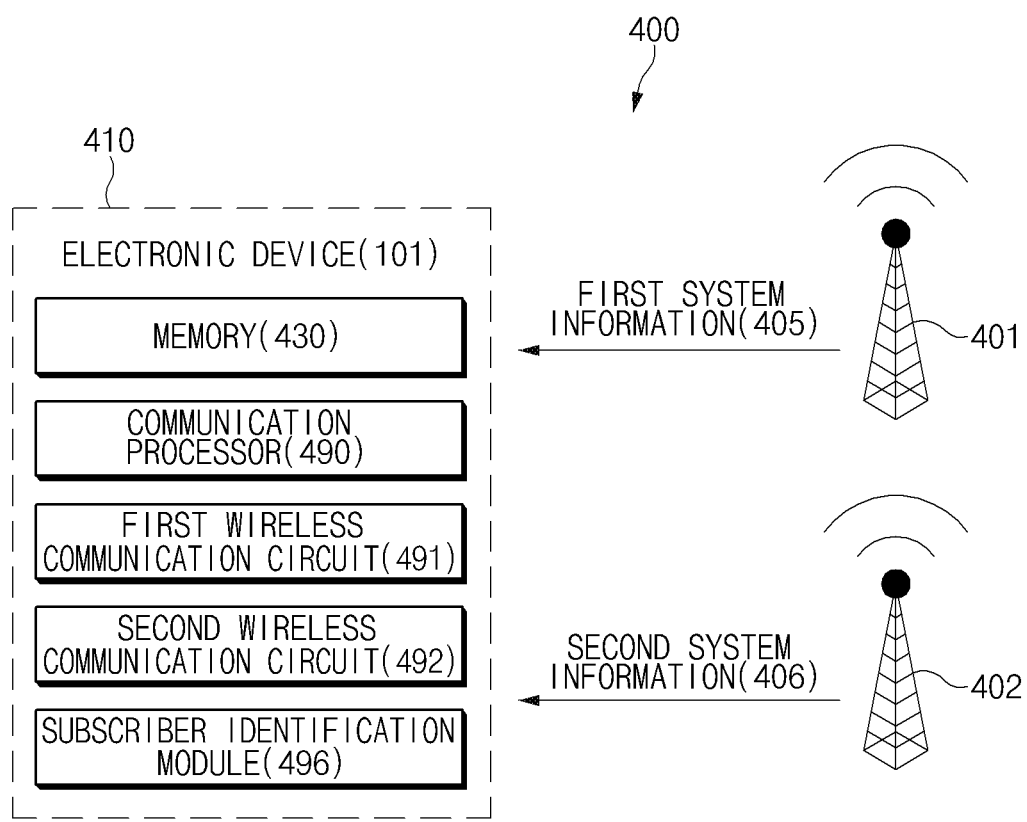
FIG. 4 illustrates a block diagram of an electronic device performing cell selection according to an embodiment of the disclosure.

FIG. 4 illustrates a block diagram 400 of the electronic device 101 performing cell selection according to an embodiment of the disclosure.

Referring to FIG. 4, the electronic device 101 may include a memory 430 (e.g., the memory 130 of FIG. 2), a communication processor 490 (e.g., the first communication processor 212 and/or the second communication processor 214 of FIG. 2), a first wireless communication circuit 491 (e.g., the first RFIC 222 and/or the second RFIC 224 of FIG. 2), a second wireless communication circuit 492 (e.g., the third RFIC 226 of FIG. 2), and a subscriber identification module 496 (e.g., the subscriber identification module 196 of FIG. 1). For example, the above components of the electronic device 101 may be disposed within and/or on a housing 410 corresponding to at least a part of the exterior of the electronic device 101. The components of the electronic device 101 illustrated in FIG. 4 are exemplary, and the electronic device 101 may further include a component not illustrated in FIG. 4. The electronic device 101 may not include, for example, at least one of the components illustrated in FIG. 4.

According to an embodiment, the memory 430 may store one or more instructions that, when executed, cause the communication processor 490 to perform operations of the electronic device 101 to be described later. The memory 430 may be implemented as a part of the communication processor 490. For another example, the memory 430 may be an external component of the communication processor 490, which is operatively connected with the communication processor 490.

According to an embodiment, the first wireless communication circuit 491 may be operatively connected with the communication processor 490 and may be configured to transmit/receive a first wireless signal associated with a first radio access technology (RAN). For example, the first RAT may correspond to an access technology (e.g., an E-UTRA) of a long-term evolution (LTE) communication network. The second wireless communication circuit 492 may be operatively connected with the communication processor 490 and may be configured to transmit/receive a second wireless signal associated with a second RAT. For example, the second RAT may correspond to an access technology of a New Radio (NR) communication network.

According to an embodiment, the communication processor 490 may be operatively connected with the memory 430, the first wireless communication circuit 491, the second wireless communication circuit 492, and/or the subscriber identification module 496. The communication processor 490 may include at least one processor. For example, the communication processor 490 may include a communication processor associated with the first RAT and a communication processor associated with the second RAT.

According to an embodiment, the subscriber identification module 496 may store information for identification of the electronic device 101 in a network. For example, the subscriber identification module 496 may store an international mobile subscriber identity (IMSI). According to an embodiment, the subscriber identification module 496 may store at least one PLMN information. The at least one PLMN information may include, for example, information for the HPLMN and/or the EHPLMN.

According to an embodiment, to perform PLMN selection defined in the 3rd generation partnership project (3GPP) technical specification (TS) 23.122, the electronic device 101 may utilize pieces of information stored in the subscriber identification module 496 at a non-access stratum (NAS). For example, the subscriber identification module 496 may include an elementary file (EF) including priority information about at least one PLMN. The EF including the priority information may include a list of PLMNs arranged on a priority basis. For example, each PLMN may include a mobile country code (MCC) and a mobile network code (MNC).

For example, the information stored in the subscriber identification module 496 may include information such as "HPLMN Selector with Access Technology", "Operator controlled PLMN Selector with Access Technology", "User Controlled PLMN Selector with Access Technology", "Forbidden PLMNs", and/or "Equivalent HPLMN". Information capable of being used for the PLMN selection may be referenced by the 3GPP TS 31.102. The PLMN selection information (e.g., "HPLMN Selector with Access Technology", "Operator controlled PLMN Selector with Access Technology", and/or "User Controlled PLMN Selector with Access Technology") may include access technology (Act) information associated with each PLMN entry. For example, the PLMN selection information may include information of a list form indicating a priority of a combination of each PLMN and an access technology. To support cell searching of an access stratum (AS) depending on a given priority list, the NAS of the electronic device 101 may transfer PLMN and access technology information to the AS.

According to an embodiment, the AS may perform the cell search on all bands capable of being supported by the electronic device 101 based on the access technology information provided from the NAS. While the AS performs the cell search, the AS may receive system information block-1 (SIB-1) from each cell and may obtain PLMN information of the corresponding cell from the SIB-1 in the form of a list. The AS may determine whether the obtained PLMN information coincides with the PLMN information transferred from the NAS. For example, when the AS finds a PLMN coinciding with the PLMN information transferred from the NAS, the AS may transfer the corresponding information to the NAS. For another example, in the case where the AS fails to find a PLMN corresponding to the PLMN transferred from the NAS, the AS may transfer all PLMN information found in the cell search process to the NAS in the form of a list such that the NAS is capable of selecting a PLMN automatically or manually.

For example, in the case where a PLMN corresponding to the PLMN transferred to the AS is found in the cell search process or in the case where it is possible to select an appropriate PLMN from the PLMN list transferred from the AS depending on a PLMN priority stored in the subscriber identification module 496, the NAS may select a communication system for the found or selected PLMN and may perform a registration procedure on the selected communication system. In the case where the NAS fails to select an appropriate PLMN from the PLMN list received from the AS, the NAS may perform the cell search operation for the PLMN selection by sequentially transferring access technology information having a next priority to the AS depending on priority information stored in the subscriber identification module 496.

As described above, for selection of a communication system, the electronic device 101 may perform the cell search based on a priority list composed of combinations of PLMN and RAN access technology values. With regard to PLMNs found in the cell search process based on an access technology value included in a priority, the electronic device 101 may sequentially try to register on a specific PLMN selected according to the priority or on a PLMN of a high priority. In this case, an NAS layer may select a system core (or a core network) and may perform registration on the selected system core.

The 3GPP technical specification may define a new access technology value called "NG-RAN" for the purpose of supporting the cell search and the PLMN selection for a 5G RAN newly added in the NR environment. As such, a 5G access technology value called "NG-RAN" may be added to an access technology value in addition to a predefined access technology value (e.g., 2G, 3G, 4G with NB (narrowband), 4G with WB (wideband), and 4G). For example, Table 1 below may show a PLMN access technology identifier defined by the 3GPP technical specification. For example, the subscriber identification module 496 may store a PLMN access technology identifier ATI indicating access technology information about each PLMN in priority information, together with the PLMN. For example, the PLMN access technology identifier may be composed of a bit string of 8 bits as expressed in Table 1 below. In Table 1 below, "b1" may indicate a least significant bit (LSB), and "b8" may indicate a most significant bit (MSB).

TABLE 1

| Bit Number | Definition |
|---|---|
| b1-b3 | RFU (reserved for future use) |
| b4 | NG-RAN |
| b5 | E-UTRAN in NB(narrowband)-S1 mode |
| b6 | E-UTRAN in WB(wideband)-S1 mode |
| b7 | E-UTRAN |
| b8 | UTRAN |

For example, the case where a value of a bit (e.g., the fourth LSB (b4)) indicating the NG-RAN is a first value (e.g., "1") may mean that the E-UTRA or NR being a wireless network access technology, which a wireless communication system corresponding to the corresponding PLMN provides, is connected to a 5GC (e.g., the 5GC 352). For another example, the case where a value of the bit (e.g., b4) indicating the NG-RAN is a second value (e.g., "0") or at least one of bits (e.g., b5 to b7) indicating the E-UTRAN is the first value (e.g., "1") may mean that the E-UTRA being a wireless network access technology, which a wireless communication system corresponding to the corresponding PLMN provides, is connected to an EPC (e.g., the EPC 342).

In a network environment before 5G, an RAN matched with each system core may be implemented by one access technology. Accordingly, after the electronic device 101 performs the PLMN selection and the cell search, the electronic device 101 may perform a registration procedure on a system core interworking with the corresponding cell. However, in the 5G network environment, a 5G system core (or a 5GC) may be connected to an LTE cell (e.g., an eLTE cell) or an NR cell in compliance with a network configuration policy of a provider. In contrast, an EPC being an LTE system core may be connected to an NR cell and an LTE cell.

FIGS. 5 to 9 illustrate configurations of wireless communication systems according to various embodiments of the disclosure.

Figure 5:
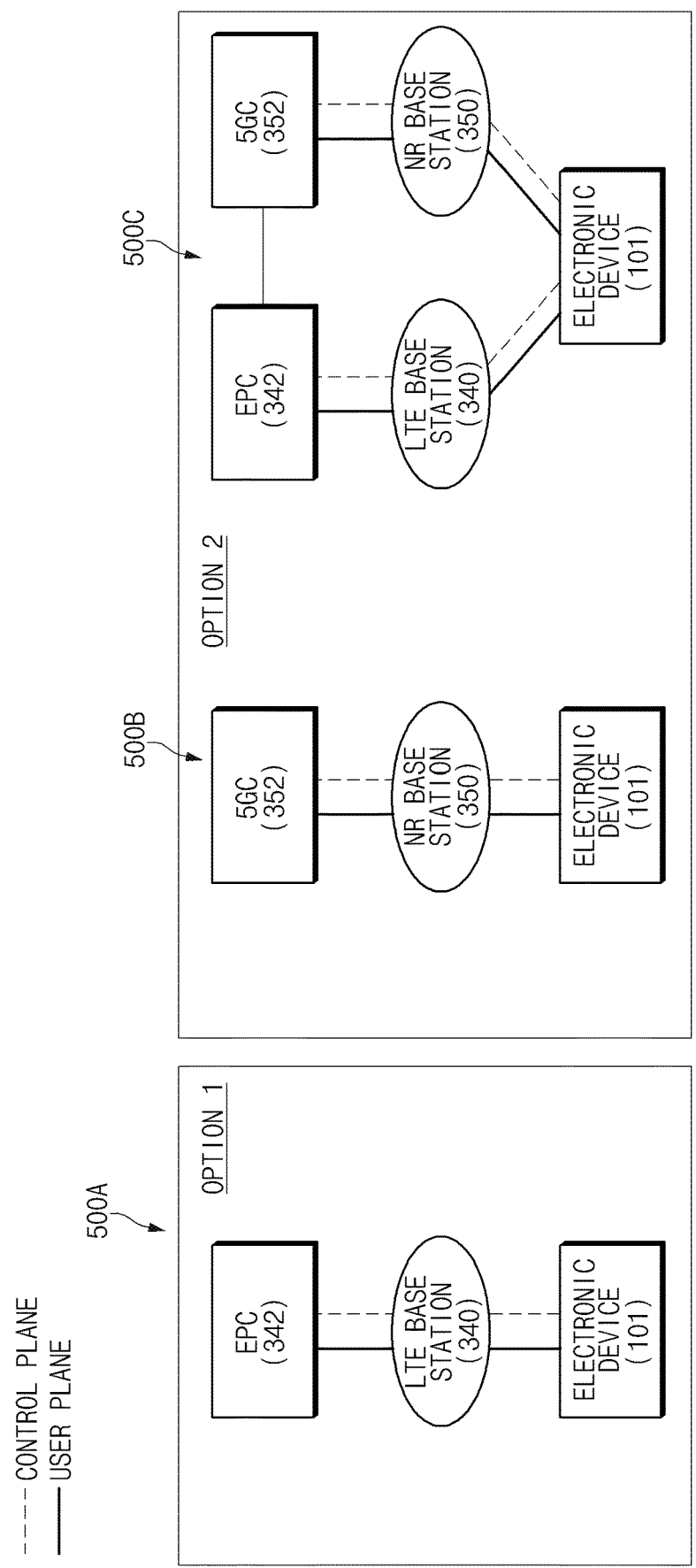
FIG. 5 illustrates configurations of a wireless communication system according to an embodiment of the disclosure.

Referring to FIG. 5, reference numeral 500A illustrates a configuration of a wireless communication system according to a first option. In reference numeral 500A, the electronic device 101 may be connected to the EPC 342 through the LTE base station 340. In the ATI corresponding to a PLMN providing this wireless communication system, a value of the bit indicating the NG-RAN may be the second value (e.g., "0").

In FIG. 5, reference numeral 500B and reference numeral 500C illustrate configurations of wireless communication systems according to a second option. In reference numeral 500B, the electronic device 101 may be connected to the 5GC (5th generation core) 352 through the NR base station 350. In reference numeral 500C, the electronic device 101 may be connected to the EPC 342 through the LTE base station 340 and may be connected to the 5GC (5th generation core) 352 through the NR base station 350. In the ATI corresponding to a PLMN providing the wireless communication systems, a value of the bit indicating the NG-RAN may be the first value (e.g., "1").

Figure 6:
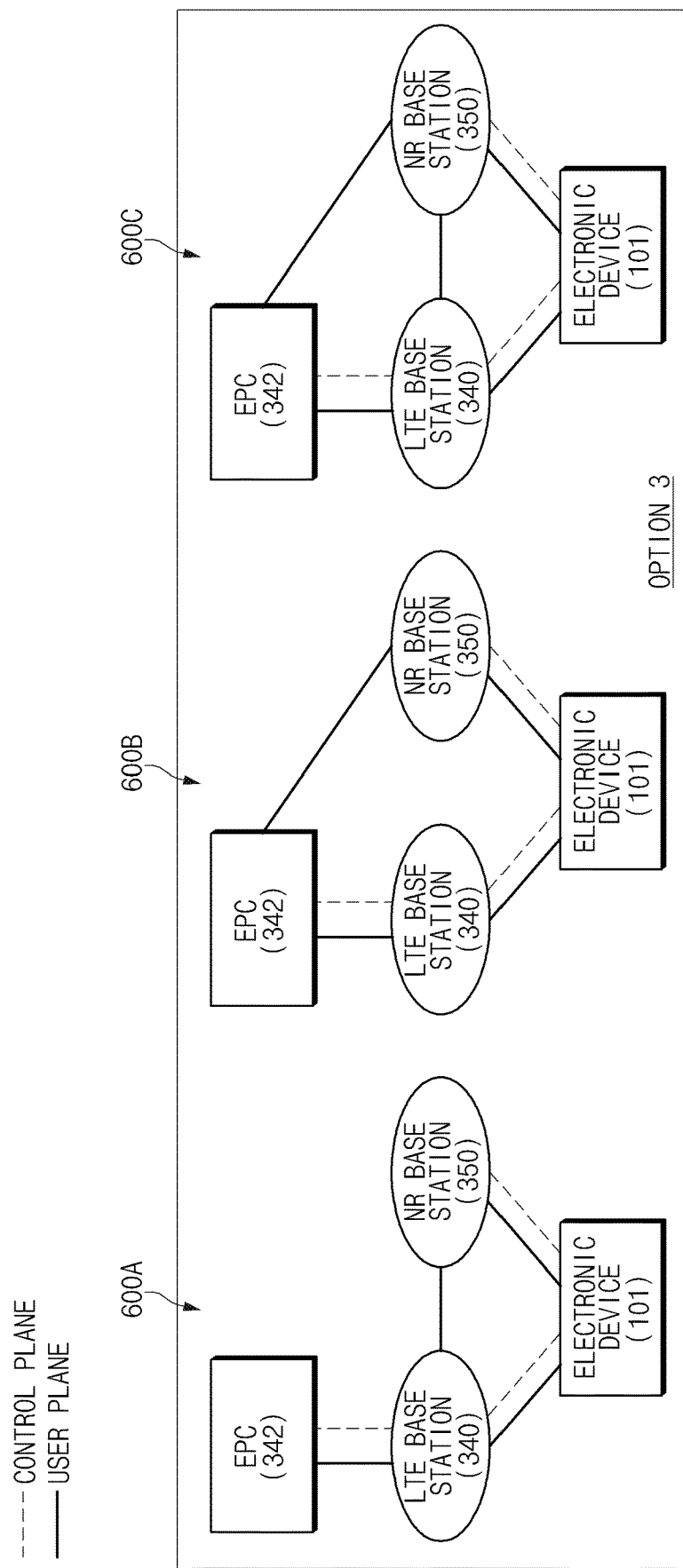
FIG. 6 illustrates configurations of a wireless communication system according to an embodiment of the disclosure.

Referring to FIG. 6, reference numeral 600A, reference numeral 600B, and reference numeral 600C illustrate configurations of wireless communication systems according to a third option. In reference numeral 600A, reference numeral 600B, and reference numeral 600C, the electronic device 101 may be connected to the EPC 342 through the LTE base station 340. In the ATI corresponding to a PLMN providing the wireless communication systems, a value of the bit indicating the NG-RAN may be the second value (e.g., "0").

Figure 7:
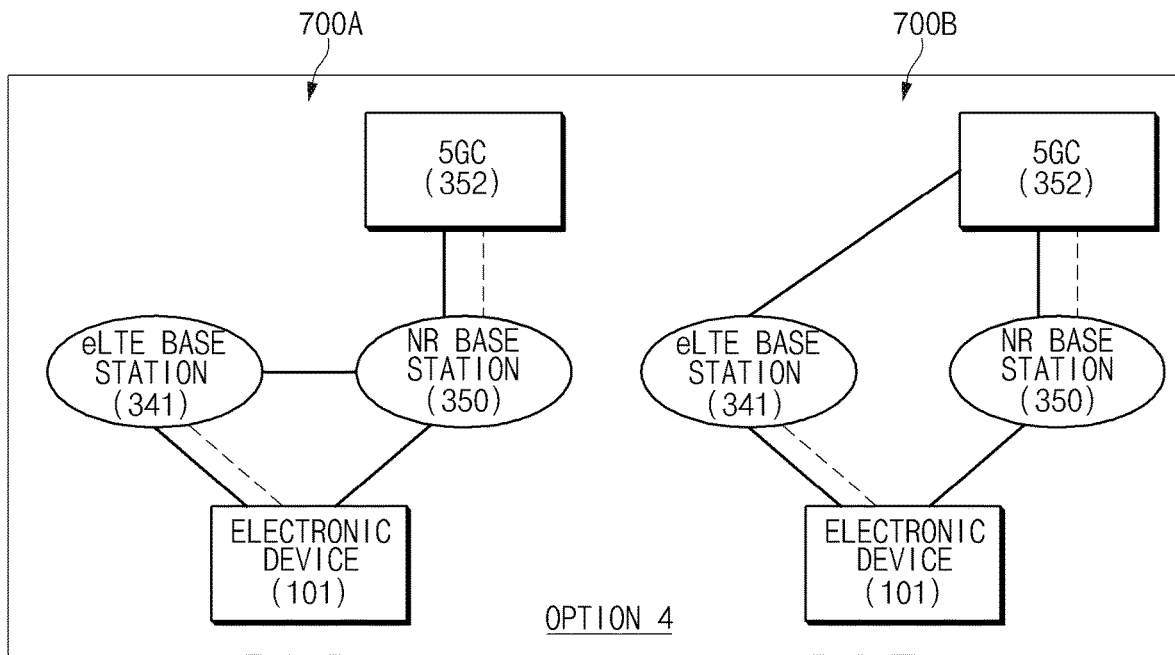
FIG. 7 illustrates configurations of a wireless communication system according to an embodiment of the disclosure.

Referring to FIG. 7, reference numeral 700A and reference numeral 700B illustrate configurations of wireless communication systems according to a fourth option. In reference numeral 700A and reference numeral 700B, the electronic device 101 may be connected to the 5GC 352 through the NR base station 350. In the ATI corresponding to a PLMN providing the wireless communication systems, a value of the bit indicating the NG-RAN may be the first value (e.g., "1").

Figure 8:
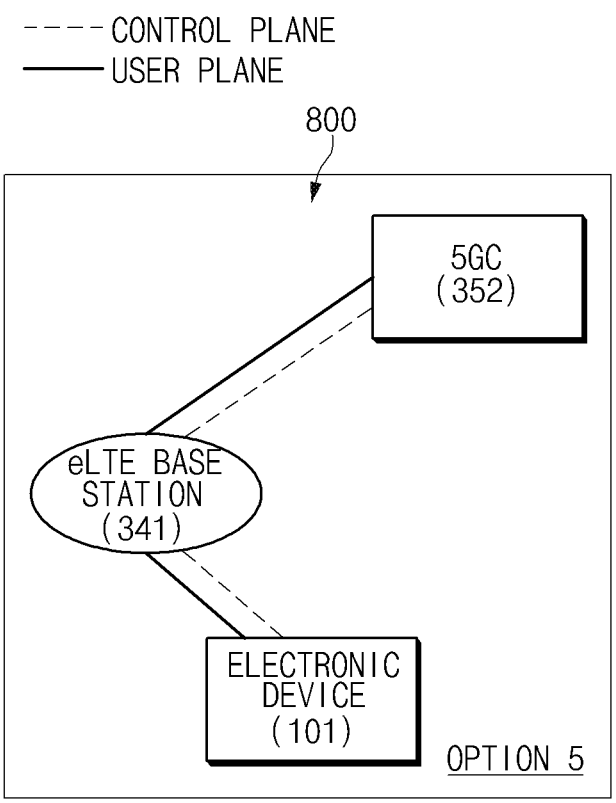
FIG. 8 illustrates configurations of a wireless communication system according to an embodiment of the disclosure.

Referring to FIG. 8, reference numeral 800 illustrates a configuration of a wireless communication system according to a fifth option. In reference numeral 800, the electronic device 101 may be connected to the 5GC 352 through an evolved LTE (eLTE) base station 341. In the ATI corresponding to a PLMN providing the wireless communication system, a value of the bit indicating the NG-RAN may be the first value (e.g., "1").

Figure 9:
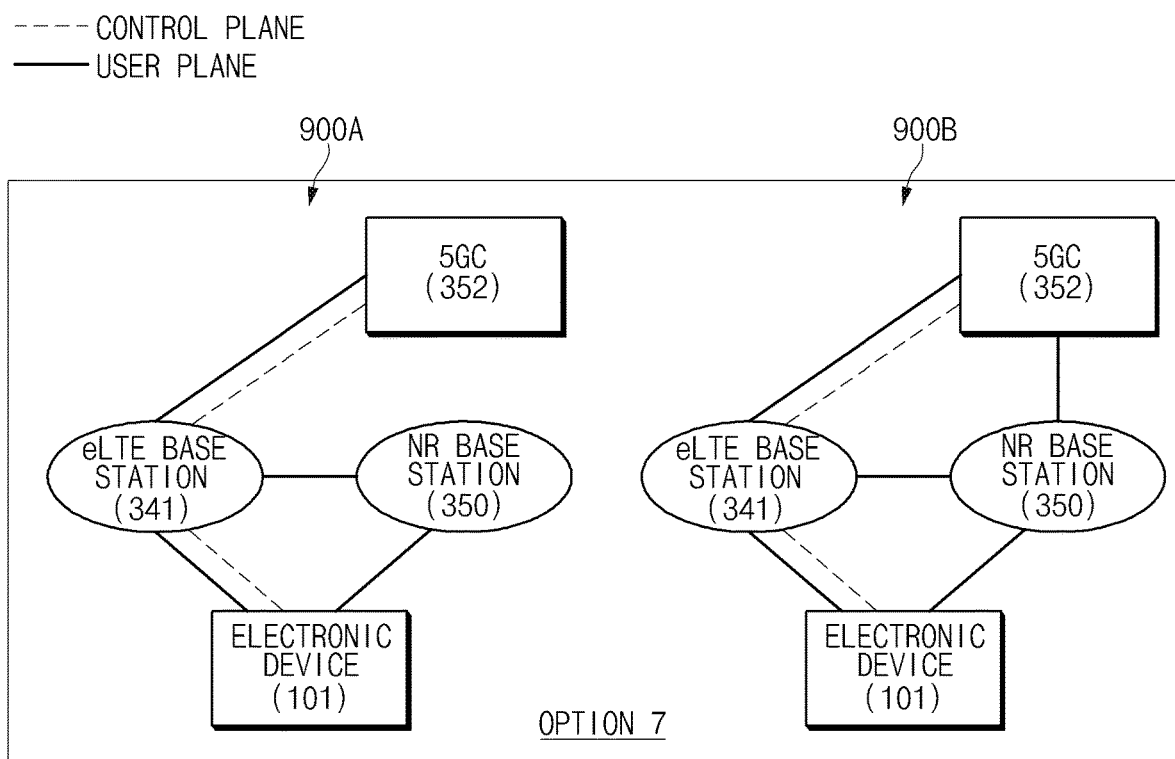
FIG. 9 illustrates configurations of a wireless communication system according to an embodiment of the disclosure.

Referring to FIG. 9, reference numeral 900A and reference numeral 900B illustrate configurations of wireless communication systems according to a seventh option. In reference numeral 900A and reference numeral 900B, the electronic device 101 may be connected to the 5GC 352 through the eLTE base station 341. In the ATI corresponding to a PLMN providing the wireless communication systems, a value of the bit indicating the NG-RAN may be the first value (e.g., "1").

Table 2 below shows access technologies according to the network deployment of FIGS. 5 to 9.

TABLE 2

| Cell selection | Core selection | Deployment option |
|---|---|---|
| LTE | EPC | Option 1, Option 3 |
| LTE | 5GC | Option 5, Option 7 |
| NR | 5GC | Option 2, Option 4 |

As understood from Table 2 above, in the case where a deployment option of a network is option 5, option 7, option 2, or option 4, a value of the bit indicating the NG-RAN from among bits of a selected ATI may be the first value (e.g., "1"). In this case, it may be understood that the electronic device 101 performs cell selection by using an RAT of one of an E-UTRA (LTE) or an NR through a value of the bit indicating the NR-RAN and accesses a 5GC. The electronic device 101 may determine whether to perform the cell search and the cell selection by using any RAT. Afterwards, the electronic device 101 may perform a registration on the 5GC by using a selected cell.

In various embodiments below, the electronic device 101 may access a network by using the PLMN access technology identifier ATI in various network deployment environments.

According to various embodiments, the electronic device 101 may use the PLMN access technology identifier ATI in consideration of a core network and an RAT. For example, the PLMN access technology identifier ATI may be composed of a bit string of 8 bits as expressed in Table 3 below. In Table 3 below, "b1" may indicate a least significant bit (LSB), and "b8" may indicate a most significant bit (MSB).

TABLE 3

| Bit Number | Definition |
|---|---|
| b1-b2 | RFU (reserved for future use) |
| b3 | NG-RAN in LTE |
| b4 | NG-RAN |
| b5 | E-UTRAN in NB(narrowband)-S1 mode |

TABLE 3-continued

| Bit Number | Definition |
| --- | --- |
| b6 | E-UTRAN in WB(wideband)-S1 mode |
| b7 | E-UTRAN |
| b8 | UTRAN |

According to an embodiment, the ATI may include two bits each indicating information associated with the NG-RAN, and each of the two bits may be associated with an RAT to be supported.

For example, the case where a value of a bit (e.g., the third LSB (b3)) indicating a first NG-RAN is the first value (e.g., "1") may mean that the E-UTRA being a wireless network access technology, which a wireless communication system corresponding to the corresponding PLMN provides, is connected to a 5GC (e.g., the 5GC 352 of FIG. 3). In this case, the electronic device 101 may search for and select a cell providing the E-UTRA, may connect wireless communication, and may register on the 5GC. For another example, the case where a value of a bit (e.g., the fourth LSB (b4)) indicating a second NG-RAN is the first value may mean that the NR being a wireless network access technology, which a wireless communication system corresponding to the corresponding PLMN provides, is connected to a 5GC (e.g., the 5GC 352 of FIG. 3). The electronic device 101 may search for and select a cell providing the NR, may connect wireless communication, and may register on the 5GC. As such, in the case where a plurality of NG-RAN bits are included in the ATI, the electronic device 101 may determine an RAT targeted for frequency search, based on values of the plurality of NG-RAN bits or a value(s) of at least a part of the plurality of NG-RAN bits. For example, the plurality of NG-RAN bits may be respectively associated with different RATs.

Referring to FIG. 4, according to an embodiment, the communication processor 490 may perform frequency scanning on a PLMN of the highest priority. For example, the communication processor 490 may perform the frequency scanning by using the first wireless communication circuit 491 and the second wireless communication circuit 492 substantially simultaneously. For another example, the communication processor 490 may perform the frequency scanning by using the first wireless communication circuit 491 and the second wireless communication circuit 492 sequentially. For another example, the communication processor 490 may perform the frequency scanning by using the second wireless communication circuit 492 and the first wireless communication circuit 491 sequentially.

According to an embodiment, the communication processor 490 may perform the frequency scanning (e.g., cell search) depending on a priority associated with a PLMN. For example, the communication processor 490 may perform the frequency scanning for the purpose of searching for a PLMN corresponding to the highest priority of priority information stored in the subscriber identification module 496. In the case where the communication processor 490 fails in the cell search from the frequency scanning (e.g., fails to successively receive system information including a PLMN of the highest priority, the communication processor 490 may perform the frequency scanning on a PLMN of a next priority. For example, the communication processor 490 may perform the frequency scanning sequentially depending on PLMN priorities until succeeding in the cell search or the registration.

Referring to FIG. 4, for example, a radio access technology (RAT) of a first base station 401 may correspond to an LTE, and an RAT of a second base station 402 may correspond to an NR.

For example, in the case where the communication processor 490 performs the frequency scanning by using the first wireless communication circuit 491, the communication processor 490 may receive first system information 405 (e.g., a system information block) including PLMN information associated with the first base station 401 from the first base station 401. The communication processor 490 may compare the received PLMN information and PLMN information stored in the subscriber identification module 496 and may access the corresponding cell (e.g., a cell associated with the first base station 401) depending on a comparison result.

For another example, in the case where the communication processor 490 performs the frequency scanning by using the second wireless communication circuit 492, the communication processor 490 may receive second system information 406 (e.g., a system information block) including PLMN information associated with the second base station 402 from the second base station 402. The communication processor 490 may compare the received PLMN information and the PLMN information stored in the subscriber identification module 496 and may access the corresponding cell (e.g., a cell associated with the second base station 402) depending on a comparison result.

Figure 10:
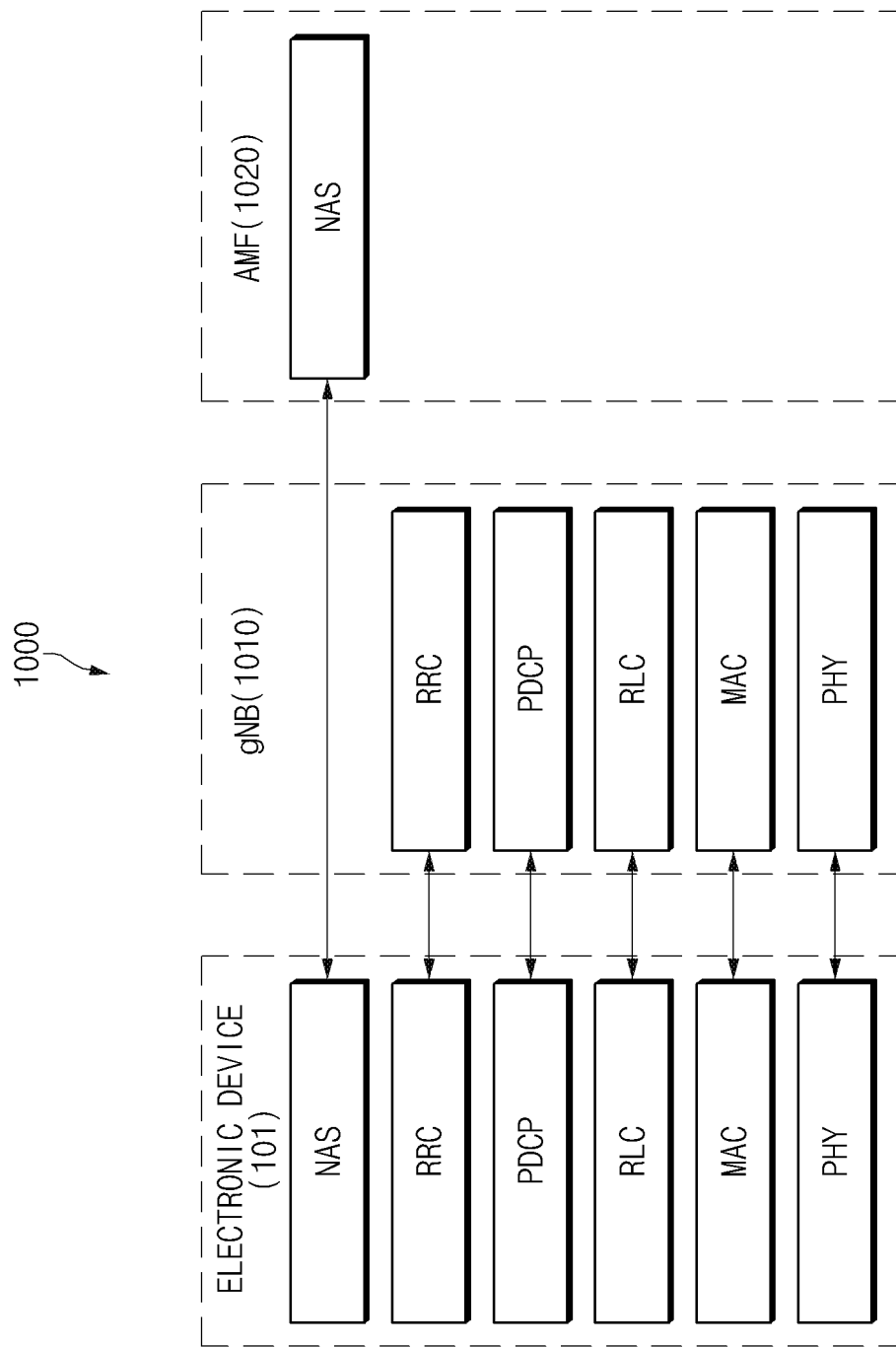
FIG. 10 illustrates a network stack of a control plane according to an embodiment of the disclosure.

FIG. 10 illustrates a network stack 1000 of a control plane according to an embodiment of the disclosure.

In a control plane, a network stack of the electronic device 101 may include a non-access stratum (NAS) layer and an access stratum (AS) layer. The electronic device 101 may communicate with an access and mobility function (AMF) 1020 of a core network on the NAS layer. The NAS may process, for example, a control message associated with authentication, registration, and/or mobility management.

The electronic device 101 may communicate with a base station (e.g., a gNB 1010) on the AS layer. The AS layer may include radio resource control (RRC), packet data convergence protocol (PDCP), radio link control (RLC), medium access control (MAC), physical (PHY) layers. The RRC layer may process, for example, a control message associated with radio bearer setting, paging, and/or mobility management. The PHY layer may perform, for example, channel coding and modulation on data received from an upper layer (e.g., an MAC layer) and may transmit a result of the channel coding and modulation to a wireless channel; the PHY layer may perform decoding and demodulation on data received over the wireless channel and may transfer a result of the decoding and demodulation to the upper layer. The MAC layer may map, for example, data logically/physically onto a wireless channel targeted for transmission and reception and may perform a hybrid automatic repeat request (HARQ) for error correction. The RLC layer may perform, for example, concatenation, segmentation, or reassembly on data and may perform order detection, reordering, or duplicate detection of data. The PDCP layer may perform, for example, an operation associated with ciphering and data integrity of a control message and user data. A user plane protocol stack may further include a service data adaptation protocol (SDAP). The SDAP may manage an assignment of a radio bearer based on a quality of service (QoS) of user data.

Referring to FIGS. 4 to 10, according to various embodiments, various types of core networks may be combined with various types of RANs. Below, for convenience, an access technology of a core network that the electronic device 101 uses may be referred to as a "non-access stratum (NAS) AcT", and an access technology of a base station may be referred to as an "access stratum (AS) AcT". In an embodiment, the NAS AcT may be determined based on an ATI stored in the subscriber identification module 496. For example, the communication processor 490 may read the ATI stored in the subscriber identification module 496 at the NAS layer and may use the read ASI as an NAS AcT value. In an embodiment, the AS AcT may be determined based on the NAS AcT. For example, the communication processor 490 may transfer an NAS AcT value from the NAS layer to the AS layer. The AS layer may determine an AS AcT value based on the NAS AcT value. In an embodiment, when the NAS AcT value means that the NG-RAN bit included in the ATI is the first value, the NAS AcT value may indicate the NG-RAN. In this case, the AS AcT may be one of LTE (eLTE) or NR. For example, the AS AcT value may indicate a value of an RAT targeted to search for a frequency band used by the wireless access technology.

According to an embodiment, a PLMN may be differently defined depending on a provider associated with the electronic device 101. For example, the PLMN may be an HPLMN. For another example, a provider may define a new PLMN for 5G and may store the newly defined PLMN for 5G in the subscriber identification module 496 as an EHPLMN. According to an embodiment, the subscriber identification module 496 of the electronic device 101 may store the PLMN for 4G and the EHPLMN for 5G. In this case, the communication processor 490 may perform PLMN search by using a PLMN having a high priority from among the HPLMN and the EHPLMN, based on a priority of an access technology.

According to various embodiments, the communication processor 490 may determine an AS AcT targeted to search for a frequency band based on a preset priority and may perform the cell search based on a determination result. For example, the communication processor 490 may determine an AS AcT targeted to search for a frequency band based on a priority set according to a deployment option and may perform the cell search on the determined AS AcT. According to an embodiment, the communication processor 490 may perform frequency band search on an AS AcT of a high priority. For example, the communication processor 490 may perform the cell search by applying the same priority to LTE and NR frequency bands with the same priority. The communication processor 490 may perform the cell search on the LTE and NR frequency bands substantially simultaneously. In this case, the communication processor 490 may try to preferentially register on a cell where a 5GC cell is first found from among two frequency bands (e.g., the LTE frequency bands and the NR frequency bands). According to an embodiment, the communication processor 490 may perform the cell search on the corresponding AS AcT, depending on a priority of a frequency band. For example, a frequency band priority may be set independently of an AcT priority. In this case, the communication processor 490 may determine a search order in a specific AcT depending on a priority for each frequency band.

Figure 11:
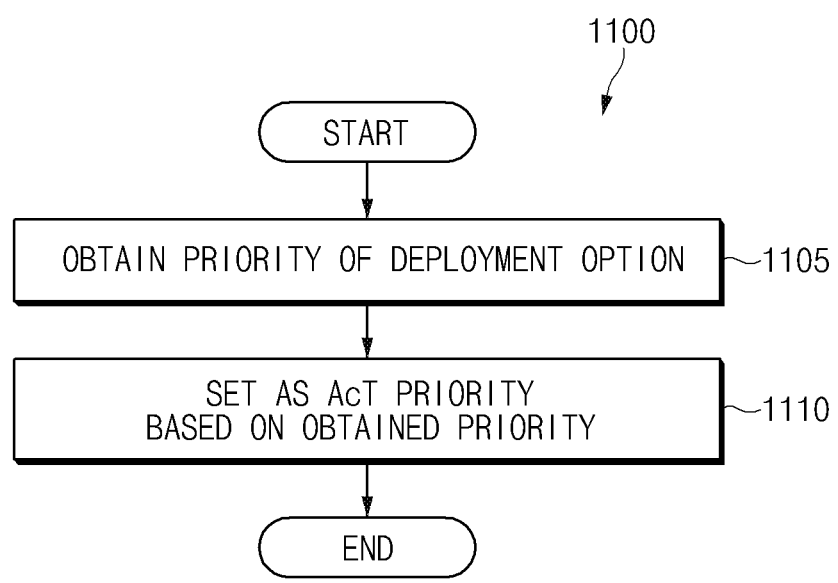
FIG. 11 is a flowchart of a priority setting method according to an embodiment of the disclosure.

FIG. 11 is a flowchart 1100 of a priority setting method according to an embodiment of the disclosure. In operation 1105, according to an embodiment, a communication processor may obtain a priority of a deployment option. For example, the communication processor 490 may obtain information about a priority set according to a deployment option from a memory (e.g., the memory 430 of FIG. 4) or a subscriber identification module (e.g., the subscriber iden-tification module 496 of FIG. 4) of an electronic device (e.g., the electronic device 101 of FIG. 4). For example, a priority of a deployment option may be determined by a manufacturer of the electronic device 101 or a network provider or may be selected by a user of the electronic device 101.

Referring to FIG. 11, in operation 1110, according to an embodiment, the communication processor 490 may set an AS AcT priority based on the obtained priority. For example, in the case where a priority of deployment option 5 and deployment option 7 is higher than a priority of deployment option 2 and deployment option 4, the communication processor 490 may set an AS AcT priority of an LTE to be higher than an AS AcT priority of an NR. For another example, in the case where the priority of deployment option 5 and deployment option 7 is lower than the priority of deployment option 2 and deployment option 4, the communication processor 490 may set the AS AcT priority of the NR to be higher than the AS AcT priority of the LTE.

The description is given in FIG. 11 as the communication processor 490 sets the AS AcT priority depending on the deployment option, but embodiments of the disclosure are not limited thereto. For example, the AS AcT priority may be set in advance. The AS AcT priority may be stored in the memory 430 or the subscriber identification module 496.

According to various embodiments, the communication processor 490 may perform cell search based on the AS AcT priority. For example, the communication processor 490 may select one PLMN from a plurality of PLMNs and may search for the selected PLMN based on the AS AcT priority. In the case where the NR has a higher AS AcT priority than the LTE, the communication processor 490 may perform frequency scanning by using a second wireless communication circuit (e.g., the second wireless communication circuit 492) supporting the NR for the purpose of searching for the selected PLMN. In the case where a PLMN is not successfully received from the frequency scanning using the second wireless communication circuit 492, the communication processor 490 may perform the frequency scanning by using a first wireless communication circuit (e.g., the first wireless communication circuit 491) supporting the E-UTRAN corresponding to a next AS AcT priority.

Figure 12:
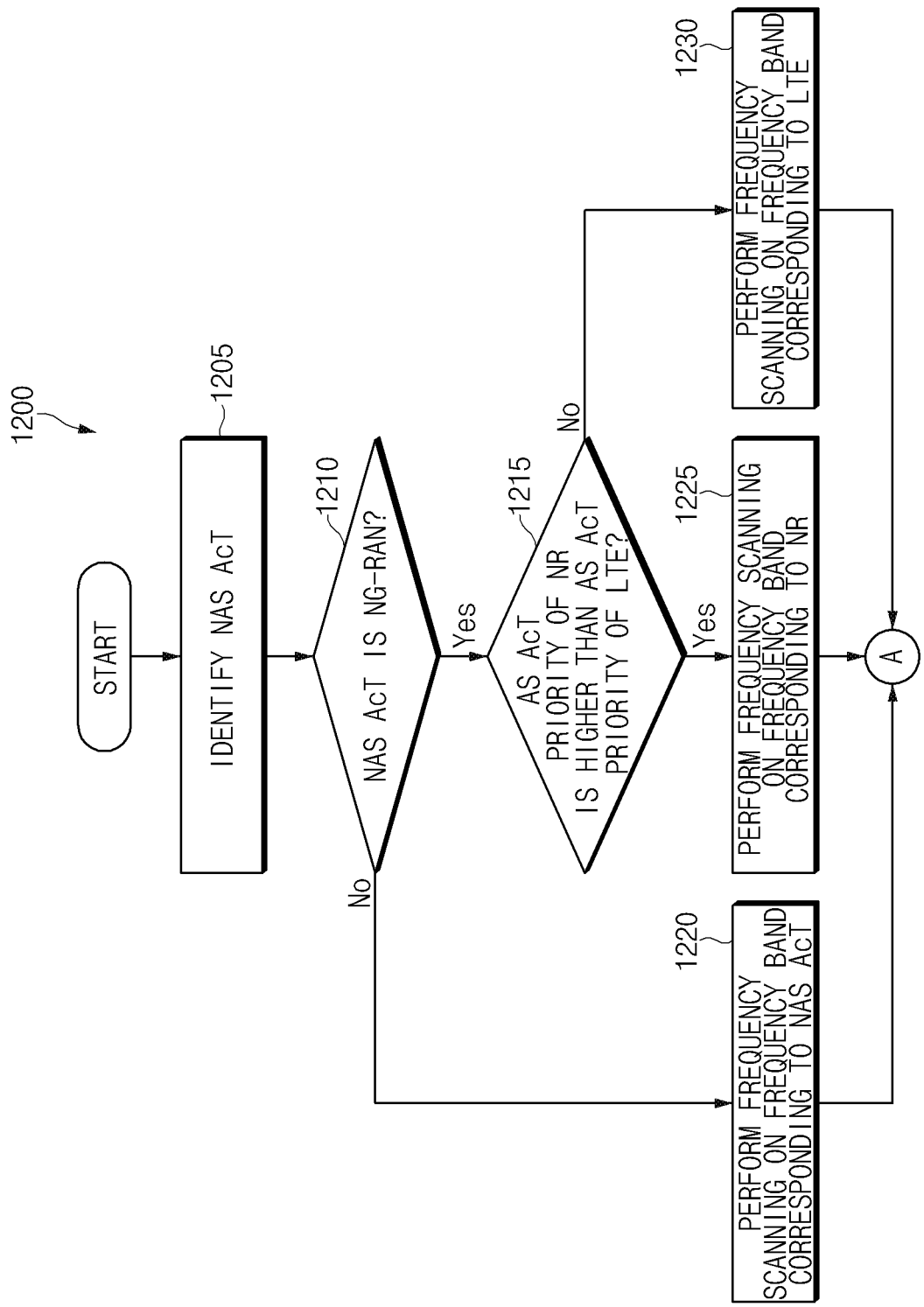
FIG. 12 is a flowchart of a frequency searching method according to an embodiment of the disclosure.

FIG. 12 is a flowchart 1200 of a frequency searching method according to an embodiment of the disclosure.

Referring to FIG. 12, in operation 1205, a communication processor (e.g., the communication processor 490 of FIG. 4) may identify a NAS AcT. For example, the communication processor 490 may identify the NAS AcT from a PLMN and AcT information of the PLMN stored in a subscriber identification module (e.g., the subscriber identification module 496 of FIG. 4). For example, the communication processor 490 may obtain AcT information of a PLMN selected according to a PLMN selection procedure from the subscriber identification module 496.

In operation 1210, according to an embodiment, the communication processor 490 may determine whether a NAS AcT indicates the NG-RAN (e.g., a core network connected to an eLTE or an NR). For example, the communication processor 490 may obtain AcT information of the PLMN from 8-bit AcT information (e.g., an access technology identifier (ATI)) of the PLMN. When a value of the fourth LSB of the ATI of the PLMN is the first value (e.g., "1"), the communication processor 490 may determine that the NAS AcT of the PLMN indicates the NG-RAN. For another example, when a value of the fourth LSB of the ATI of the PLMN is the second value (e.g., "0"), the communication processor 490 may determine that the NAS AcT of the PLMN does not indicate the NG-RAN.

When it is determined that the NAS AcT of the PLMN does not indicates the NG-RAN, in operation 1220, the communication processor 490 may perform frequency scanning on a frequency band corresponding to the NAS AcT. For example, the communication processor 490 may perform the frequency scanning by using a first wireless communication circuit (e.g., the first wireless communication circuit 491 of FIG. 4) supporting the LTE.

According to an embodiment, when the NAS AcT of the PLMN indicates the NG-RAN, in operation 1215, the communication processor 490 may determine whether an AS AcT priority of the NR is higher than an AS AcT priority of the LTE. For example, the communication processor 490 may obtain information about an AS AcT priority from a memory (e.g., the memory 430 of FIG. 4) or a subscriber identification module (e.g., the subscriber identification module 496 of FIG. 4).

According to an embodiment, when the AS AcT priority of the NR is higher than the AS AcT priority of the LTE, in operation 1225, the communication processor 490 may perform the frequency scanning on a frequency band corresponding to the NG-RAN by using a second wireless communication circuit (e.g., the second wireless communication circuit 492 of FIG. 4).

According to an embodiment, when the AS AcT priority of the LTE is higher than the AS AcT priority of the NR, in operation 1230, the communication processor 490 may perform the frequency scanning on a frequency band corresponding to the LTE by using the first wireless communication circuit 491.

Figure 13:
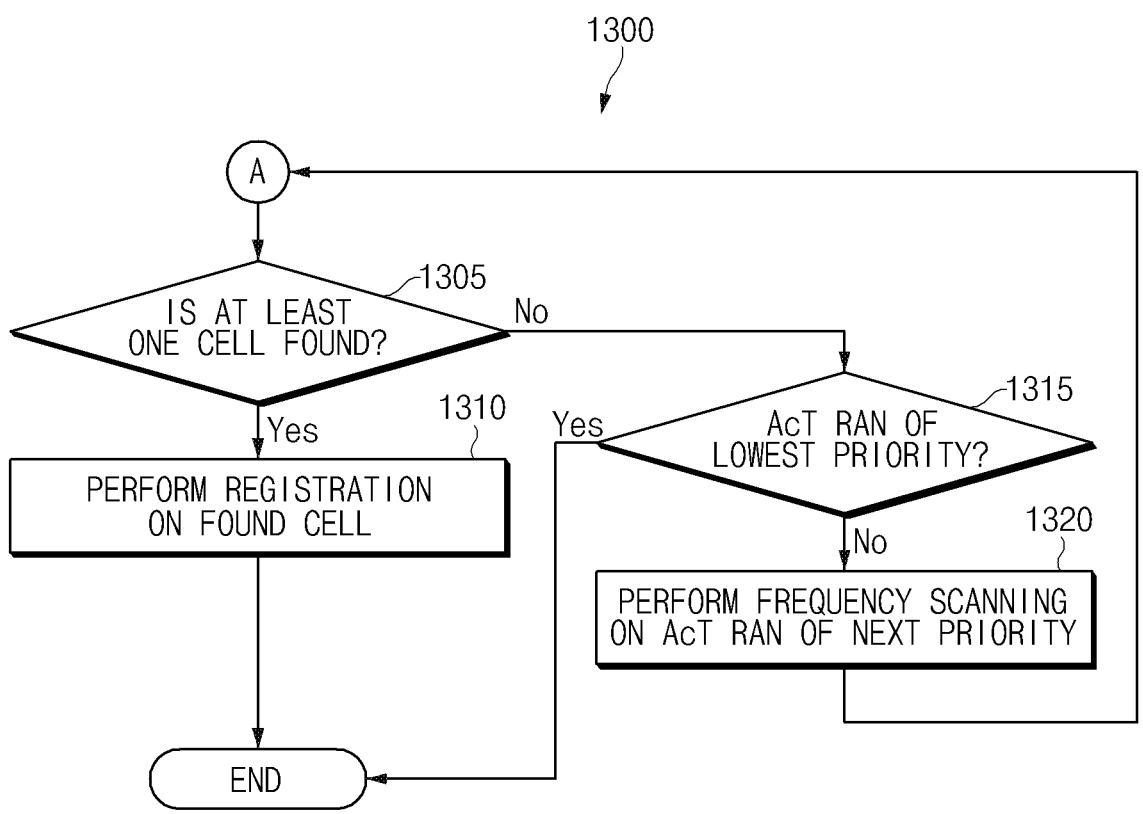
FIG. 13 is a flowchart of a frequency registration method according to an embodiment of the disclosure.

FIG. 13 is a flowchart 1300 of a frequency registration method according to an embodiment of the disclosure.

Referring to FIG. 13, for example, operation 1305 may be performed after the frequency scanning according to operation 1220, operation 1225, or operation 1230 of FIG. 12. In operation 1305, a communication processor (e.g., the communication processor 490 of FIG. 4) may determine whether at least one cell is found through the frequency scanning. For example, the communication processor 490 may search for a cell by successfully receiving system information (e.g., a system information block) including a PLMN from at least one cell.

When at least one cell is found, in operation 1310, the communication processor 490 may perform a registration procedure on the found cell. For example, the communication processor 490 may transmit cell information obtained from the AS (Access Stratum) layer to the NAS layer and may perform a network registration procedure (e.g., an attach procedure or a registration procedure) on the corresponding cell by using the obtained cell information. For example, in the case where it is determined in operation 1210 of FIG. 12 that the NAS AcT indicates the NG-RAN, the communication processor 490 may perform a registration procedure on a core network (e.g., a 5GC) connected through the corresponding cell. For another example, in the case where it is determined in operation 1210 of FIG. 12 that the NAS AcT indicates the E-UTRAN, the communication processor 490 may perform a registration procedure on a core network (e.g., an EPC) connected through the corresponding cell.

When a cell is not found, according to an embodiment, in operation 1315, the communication processor 490 may determine whether an AcT RAN on which the frequency scanning is performed is an AcT RAN of the lowest priority. For example, when it is determined that the AcT RAN on which the frequency scanning is performed is not the AcT RAN of the lowest priority, in operation 1320, the communication processor 490 may perform the frequency scanning on an AcT RAN of a next priority.

The description is given with reference to FIGS. 12 and 13 as the communication processor 490 sequentially performs the frequency scanning on respective AcT RANs, but embodiments of the disclosure are not limited thereto. For example, the communication processor 490 may perform the frequency scanning on a plurality of AcT RANs at the same time.

Figure 14:
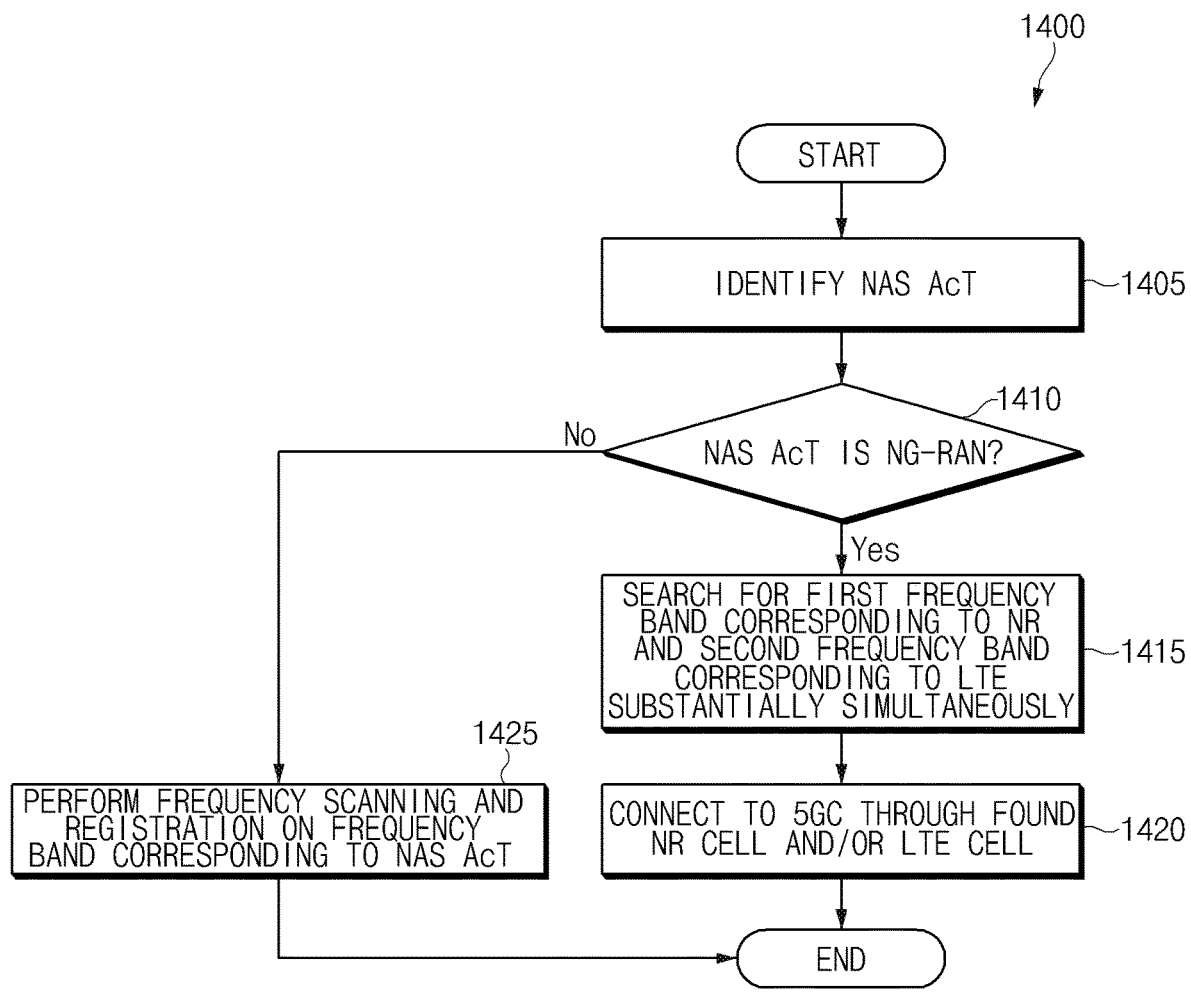
FIG. 14 is a flowchart of an access method according to an embodiment of the disclosure.

FIG. 14 is a flowchart 1400 of an access method according to an embodiment of the disclosure.

Referring to FIG. 14, a communication processor (e.g., the communication processor 490 of FIG. 4) may perform frequency scanning on a plurality of AcT RANs at the same time. For example, hardware and software of an electronic device (e.g., the electronic device 101 of FIG. 4) may perform the frequency scanning by using a first wireless communication circuit (e.g., the first wireless communication circuit 491 of FIG. 4) and a second wireless communication circuit (e.g., the second wireless communication circuit 492 of FIG. 4) substantially at the same time. For example, the first wireless communication circuit 491 and the second wireless communication circuit 492 may operate independently in hardware, and the communication processor 490 may allow the first wireless communication circuit 491 and the second wireless communication circuit 492 to work together.

According to an embodiment, in operation 1405, the communication processor 490 may identify a NAS AcT. For example, the communication processor 490 may identify the NAS AcT from a PLMN and AcT information of the PLMN stored in a subscriber identification module (e.g., the subscriber identification module 496 of FIG. 4). For example, the communication processor 490 may obtain AcT information of a PLMN selected according to a PLMN selection procedure from the subscriber identification module 496.

In operation 1410, according to an embodiment, the communication processor 490 may determine whether the NAS AcT indicates the NG-RAN. For example, the communication processor 490 may obtain AcT information of the PLMN from 8-bit AcT information (e.g., an access technology identifier (ATI)) of the PLMN. When a value of the fourth LSB of the ATI of the PLMN is the first value (e.g., "1"), the communication processor 490 may determine that the NAS AcT of the PLMN indicates the NG-RAN. For another example, when a value of the fourth LSB of the ATI of the PLMN is the second value (e.g., "0"), the communication processor 490 may determine that the NAS AcT of the PLMN does not indicate the NG-RAN.

When it is determined that the NAS AcT of the PLMN does not indicate the NG-RAN, in operation 1425, the communication processor 490 may perform frequency scanning on a frequency band corresponding to the NAS AcT. For example, the communication processor 490 may perform the frequency scanning by using a first wireless communication circuit (e.g., the first wireless communication circuit 491 of FIG. 4) supporting the LTE.

According to an embodiment, when it is determined that the NAS AcT of the PLMN indicates the NG-RAN, in operation 1415, the communication processor 490 may search for a first frequency band corresponding to an NR and a second frequency band corresponding to an LTE substantially at the same time. For example, the communication processor 490 may perform the frequency scanning by using a first wireless communication circuit (e.g., the first wireless communication circuit 491 of FIG. 4) and a second wireless communication circuit (e.g., the second wireless communication circuit 492 of FIG. 4) substantially at the same time.

According to an embodiment, in operation 1420, the communication processor 490 may connect to a 5GC through a found NR cell and/or a found LTE cell (e.g., may make network registration). For example, when an LTE cell is detected, the communication processor 490 may try to register on the 5GC through the corresponding cell. For example, when an NR cell is detected, the communication processor 490 may try to register on the 5GC through the corresponding cell.

Figure 15:
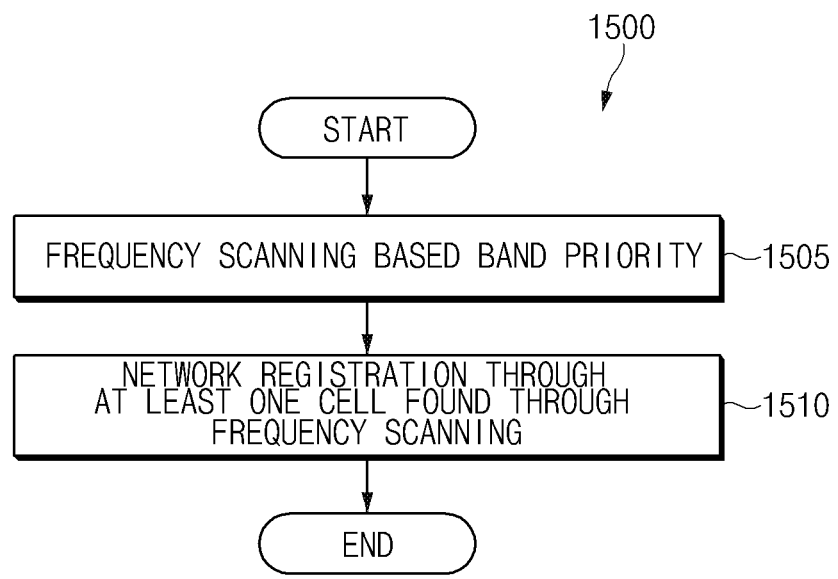
FIG. 15 is a flowchart of a frequency searching method according to an embodiment of the disclosure.

FIG. 15 is a flowchart 1500 of a frequency searching method according to an embodiment of the disclosure.

Referring to FIG. 15, a communication processor (e.g., the communication processor 490 of FIG. 4) may perform frequency scanning based on a band priority.

In operation 1505, according to an embodiment, the communication processor 490 may perform the frequency scanning based on a band priority. For example, the communication processor 490 may perform the frequency scanning on at least one band sequentially depending on a priority set to the at least one band. In operation 1510, the communication processor 490 may perform a network registration procedure through the at least one cell found through the frequency scanning.

According to an embodiment, a band priority may be set to each AS AcT. For example, a first priority may be set to LTE bands, and a second priority may be set to NR bands.

A part of bands associated with the NG-RAN may be an LTE band. For example, in the case where a part of bands associated with a PLMN for 5G (hereinafter referred to as "5G PLMN") of a specific mobile network operator (MNO) is an LTE band, the second priority may include information about the LTE band associated with the 5G PLMN. For another example, in the case where there is an LTE band set to be reusable or shared at the NG-RAN by the specific MNO, the second priority may include information about the corresponding LTE band.

For example, a band priority (e.g., the first and/or second priority) may be defined by an MNO. For another example, a band priority may be set by a manufacturer of the electronic device 101. For another example, the electronic device 101 may use a band priority corresponding to a location based on location information of the electronic device 101. The electronic device 101 may obtain a location of the electronic device 101 based on an MCC of a PLMN or GPS information and may use band priority information corresponding to the obtained location. The electronic device 101 may use priority information for each location stored in a memory (e.g., the memory 430 of FIG. 4). The electronic device 101 may receive priority information corresponding to a location from an external server.

According to an embodiment, an LTE band connected to a 5GC may also be included in a priority (e.g., the second priority) of an NG-RAN band. For example, in the case of LTE band B2 or NR band N77 or N78, the communication processor 490 may perform the frequency scanning depending on priorities of the corresponding bands in the second priority. For example, the communication processor 490 may perform the frequency scanning in the order of B2, N78, and N77 or in the order of N78, B2, and N77. Instead of the AS AcT-based priority described with reference to FIGS. 12 and 13, a priority of each band may be used for the frequency scanning.

In this case, an LTE band associated with a 5GC can be defined to be included in a band list associated with ab NG-RAN AcT. As one example, in the case where the B2 (i.e., the LTE band) used by a cell connected to a 5GC and the N77 and N78 being the NR band are considered, the AS may pre-determine AS AcT priorities of the LTE and the NR by pre-determining band priorities. In the corresponding example, the cell searching may be performed in the following order: B2→N78→N77; alternatively, the cell searching may be performed in the following order: N78→B2→N77. In addition to the examples, all orders in which configured bands are capable of being listed may be included. In the case of defining a band priority as described above, a cell searching priority may be determined by defining an LTE band in a band priority together with an NR band, with regard to the NG-RAN.

The band priority described with reference to FIG. 15 may be combined with the AS AcT of FIGS. 12 and 13. For example, in performing the frequency scanning depending on an AS AcT priority, the communication processor 490 may perform the frequency scanning depending on a band priority set to the corresponding AS AcT. As described above, the band priority may be changed depending on a location of the electronic device 101.

The frequency scanning methods described with reference to FIGS. 12 to 15 may be combined and implemented. For another example, the above frequency scanning methods may be combined and executed depending on a capability of the electronic device 101, a network deployment, and/or an MNO policy. For another example, the above frequency scanning methods may be selectively executed depending on a capability of the electronic device 101, a network deployment, and/or an MNO policy.

Figure 16:
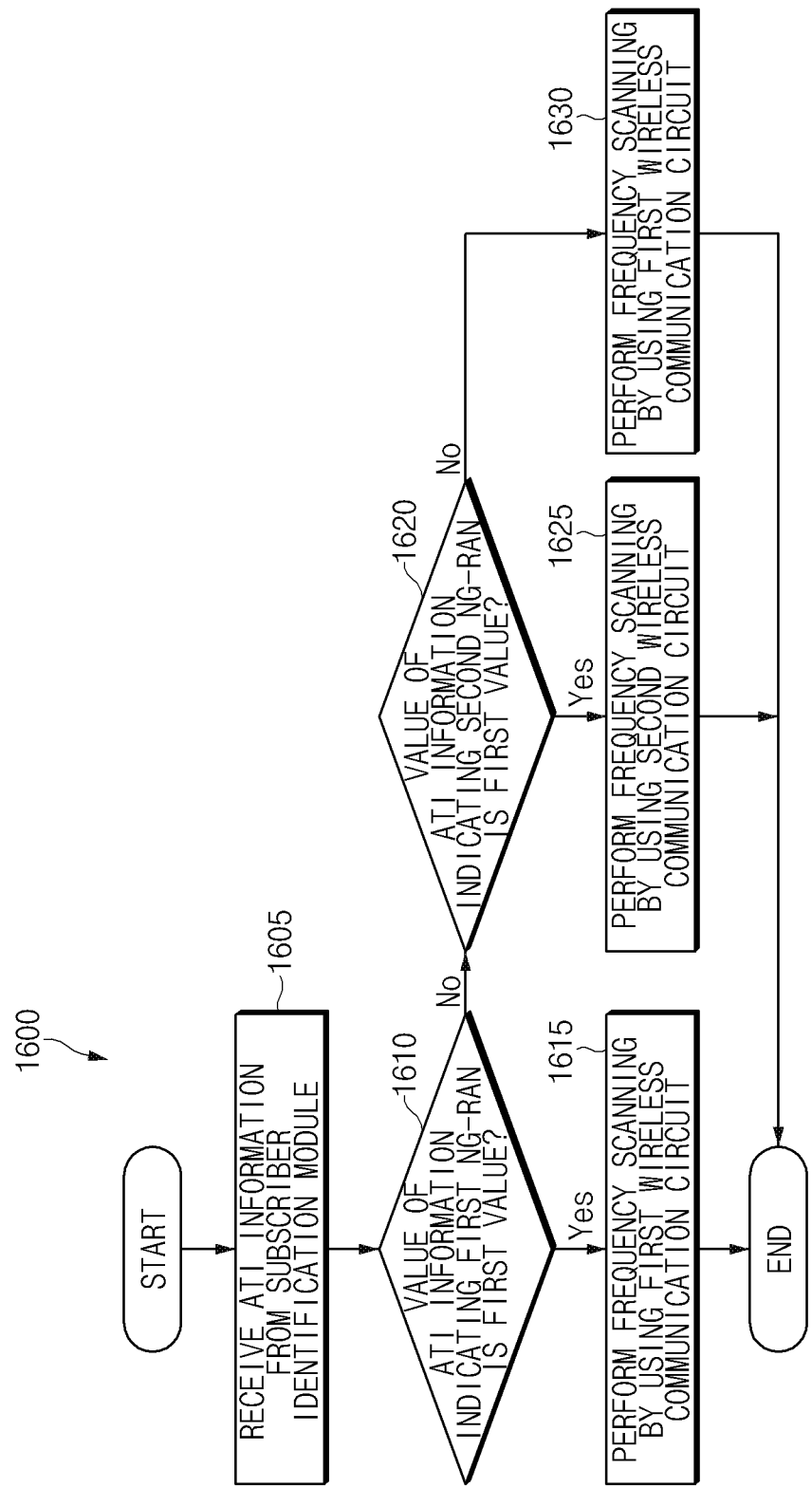
FIG. 16 is a flowchart of a frequency searching method according to an embodiment of the disclosure.

FIG. 16 is a flowchart 1600 of a frequency searching method according to an embodiment of the disclosure.

Referring to FIG. 16, in operation 1605, a communication processor (e.g., the communication processor 490 of FIG. 4) may receive the access technology identifier ATI from a subscriber identification module (e.g., the subscriber identification module 496 of FIG. 4). For example, the communication processor 490 may identify a NAS AcT from a PLMN and AcT information of the PLMN stored in a subscriber identification module (e.g., the subscriber identification module 496 of FIG. 4). For example, the communication processor 490 may obtain AcT information of a PLMN selected according to a PLMN selection procedure from the subscriber identification module 496.

In operation 1610, according to an embodiment, the communication processor 490 may determine whether a value of ATI information, which indicates the first NG-RAN, is the first value. For example, the ATI information may include 8 bits, and the third LSB of the 8 bits may be a bit indicating the first NG-RAN. For example, the third LSB may correspond to "b3" of Table 3 above. In this case, a network deployment corresponding to the corresponding PLMN may correspond to option 5 of FIG. 7 or option 7 of FIG. 8.

In operation 1615, according to an embodiment, the communication processor 490 may perform frequency scanning by using a first wireless communication circuit (e.g., the first wireless communication circuit 491 of FIG. 4). In this case, the communication processor 490 may perform the frequency scanning depending on a priority set to bands of the second RAT (e.g., an LTE).

In operation 1620, according to an embodiment, the communication processor 490 may determine whether a value (e.g., b4 of Table 3 above) indicating the second NG-RAN is the first value. For example, when the value indicating the second NG-RAN is the first value, a network deployment corresponding to the corresponding PLMN may correspond to option 2 of FIG. 5 or option 4 of FIG. 7.

In operation 1625, according to an embodiment, the communication processor 490 may perform the frequency scanning by using a second wireless communication circuit (e.g., the second wireless communication circuit 492 of FIG. 4). In this case, the communication processor 490 may perform the frequency scanning depending on a priority set to bands of the first RAT (e.g., an NR).

When all the values indicating the first NG-RAN and the second NG-RAN are the first value, the communication processor 490 may perform the frequency scanning by using the first wireless communication circuit (e.g., the first wireless communication circuit 491 of FIG. 4) as in operation 1630. In this case, the communication processor 490 may perform the frequency scanning depending on the priority set to the bands of the second RAT (e.g., an LTE).

According to various embodiments, an electronic device (e.g., the electronic device 101 of FIG. 1) may include a first wireless communication circuit (e.g., the first RFIC 222 of FIG. 2) that provides a first radio access technology (RAT) associated with a long term evolution (LTE), a second wireless communication circuit (e.g., the second RFIC 224 and/or the third RFIC 226 of FIG. 2) that provides a second RAT associated with a new radio (NR), a subscriber identification module (e.g., the subscriber identification module 196 of FIG. 1), a communication processor (e.g., the first communication processor 212 and/or the second communication processor 214 of FIG. 2) that is operatively connected with the first wireless communication circuit, the second wireless communication circuit, and the subscriber identification module, and a memory (e.g., the memory 130 of FIG. 1) that is operatively connected with the communication processor. The memory may store one or more instructions that, when executed, cause the communication processor to perform operations of the electronic device to be described later.

According to an embodiment, the electronic device may obtain access technology identifier (ATI) information associated with one public land mobile network (PLMN) from the subscriber identification module and may perform frequency scanning by using the first wireless communication circuit, when the ATI information indicates a next generation radio access network (NG-RAN) associated with the first RAT. For example, the ATI information may include a bit string of a 8-bit length, and a first value (e.g., "1") of a third least significant bit (LSB) of the ATI information may indicate the NG-RAN associated with the first RAT.

According to an embodiment, the electronic device may perform frequency scanning by using the first wireless communication circuit, depending on a band priority set to frequency bands of the first RAT, when the ATI information indicates the NG-RAN associated with the first RAT.

According to an embodiment, the electronic device may perform frequency scanning by using the second wireless communication circuit, when the ATI information indicates an NG-RAN associated with the second RAT.

For example, the ATI information may include a bit string of a 8-bit length, and a first value (e.g., "1") of a fourth least significant bit (LSB) of the ATI information may indicate the NG-RAN associated with the second RAT.

According to an embodiment, the one or more instructions, which executed, may cause the communication processor to perform frequency scanning depending on a band priority set to frequency bands of the second RAT by using the second wireless communication circuit, when the ATI information indicates the NG-RAN associated with the second RAT.

For example, the PLMN may be a PLMN having a highest priority from among a plurality of PLMNs stored in the subscriber identification module. The PLMN may be a home PLMN (HPLMN) or an equivalent HPLMN (EHPLMN) among a plurality of PLMNs stored in the subscriber identification module.

According to an embodiment, the one or more instructions, which executed, may cause the communication processor to search for one or more cells through the frequency scanning and to identify system information of the found cell.

According to an embodiment, the one or more instructions, which executed, may cause the communication processor to connect to a $5^{th}$ generation (5G) core through the found cell by using the first wireless communication circuit, when the system information of the found cell indicates that a core of the cell is the 5G core.

According to various embodiments, a frequency scanning method of an electronic device may include an operation (e.g., operation 1605 of FIG. 16) of obtaining access technology identifier (ATI) information associated with one public land mobile network (PLMN) from a subscriber identification module of the electronic device and an operation (e.g., operation 1610 and operation 1615 of FIG. 16) of performing frequency scanning by using a first wireless communication circuit configured to provide a first radio access technology (RAT) associated with a long term evolution (LTE), when the ATI information indicates a next generation radio access network (NG-RAN) associated with the first RAT.

For example, the ATI information may include a bit string of a 8-bit length, and a first value (e.g., "1") of a third least significant bit (LSB) of the ATI information may indicate the NG-RAN associated with the first RAT.

For example, the operation of performing the frequency scanning by using the first wireless communication circuit configured to provide the first RAT may include performing frequency scanning by using the first wireless communication circuit, depending on a band priority set to frequency bands of the first RAT.

For example, the operation of performing frequency scanning by using the second wireless communication circuit may include performing frequency scanning by using the second wireless communication circuit, depending on a band priority set to frequency bands of the second RAT.

According to an embodiment, the frequency scanning method may further include searching one or more cells through the frequency scanning and identifying system information of the found cell.

According to an embodiment, the frequency scanning method may further includes connecting to a $5^{th}$ generation (5G) core through the found cell by using the first wireless communication circuit, when the system information of the found cell indicates that a core of the cell is the 5G core.

According to various embodiments, an electronic device (e.g., the electronic device 101 of FIG. 1) may include a first wireless communication circuit (e.g., the first RFIC 222 of FIG. 2) that provides a first radio access technology (RAT) associated with a long term evolution (LTE), a second wireless communication circuit (e.g., the second RFIC 224 and/or the third RFIC 226 of FIG. 2) that provides a second RAT associated with a new radio (NR), a subscriber identification module (e.g., the subscriber identification module 196 of FIG. 1), a communication processor (e.g., the first communication processor 212 and/or the second communication processor 214 of FIG. 2) that is operatively connected with the first wireless communication circuit, the second wireless communication circuit, and the subscriber identification module, and a memory (e.g., the memory 130 of FIG. 1) that is operatively connected with the communication processor. The memory may store one or more instructions that, when executed, cause the communication processor to perform operations of the electronic device to be described later.

The one or more instructions, when executed, may cause the communication processor to obtain access technology identifier (ATI) information associated with one public land mobile network (PLMN) from the subscriber identification module and to perform frequency scanning by using the first wireless communication circuit or the second wireless communication circuit based on an RAT priority or a band priority stored in the memory, when the ATI information indicates a next generation radio access network (NG-RAN). For example, the ATI information may include a bit string of a 8-bit length, and a first value of a fourth least significant bit (LSB) of the ATI information may indicate the NG-RAN.

According to an embodiment, the one or more instructions, which executed, may cause the communication processor to perform frequency scanning from an RAT, the RAT priority of which is relatively high, from among the first RAT and the second RAT. For example, the communication processor may perform frequency scanning by using a communication circuit corresponding to an RAT of a high priority. When failing in cell search through frequency scanning, the communication processor may perform frequency scanning by using a communication circuit corresponding to an RAT of a next priority.

For example, the band priority may include a plurality of bands and a priority associated with RAT information of the plurality of bands. The band priority may be differently set depending on a location. For example, the electronic device may obtain location information by using a mobile country code (MCC) or a GPS and may use a band priority corresponding to the obtained location information.

According to various embodiments of the disclosure, an electronic device may perform cell selection by considering both an access technology of a cell and an access technology of a core network.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first wireless communication circuit configured to provide wireless communication based on a first radio access technology (RAT) associated with a long term evolution (LTE);
a second wireless communication circuit configured to provide wireless communication based on a second RAT associated with a new radio (NR);
a subscriber identification module;
a processor connected with the first wireless communication circuit, the second wireless communication circuit, and the subscriber identification module; and
a memory connected with the processor, wherein the memory stores one or more instructions that, when executed by the processor, cause the electronic device to:
obtain access technology identifier (ATI) information associated with one public land mobile network (PLMN) from the subscriber identification module, and
based on the ATI information indicating a next generation radio access network (NG-RAN), perform frequency scanning by using the first wireless communication circuit or the second wireless communication circuit based on an RAT priority.

2. The electronic device of claim 1,
wherein the ATI information includes a bit string of a 8-bit length, and
wherein a value of a fourth least significant bit (LSB) of the ATI information indicates the NG-RAN.

3. The electronic device of claim 1, wherein the one or more instructions, which when executed by the processor, cause the electronic device to:
based on the ATI information indicating an evolved universal mobile terrestrial radio access network (E-UTRAN), perform frequency scanning by using the first wireless communication circuit.

4. The electronic device of claim 1, wherein the one or more instructions, which when executed by the processor, cause the electronic device to:
perform a first frequency scanning by using the first wireless communication circuit, based on a priority of the first RAT being higher than a priority of the second RAT.

5. The electronic device of claim 4, wherein the one or more instructions, which when executed by the processor, cause the electronic device to:
when the electronic device fails to find a cell from the first frequency scanning, perform a second frequency scanning using the second wireless communication circuit.

6. The electronic device of claim 1, wherein the one or more instructions, which when executed by the processor, cause the electronic device to:
based on the ATI information indicating the NG-RAN, perform the frequency scanning by selectively using the first wireless communication circuit or the second wireless communication circuit based on the RAT priority, and
based on the ATI information indicating an evolved universal mobile terrestrial radio access network (E-UTRAN), perform the frequency scanning by using the first wireless communication circuit.

7. The electronic device of claim 1, wherein the PLMN comprises a PLMN having a highest priority from among a plurality of PLMNs stored in the subscriber identification module.

8. The electronic device of claim 1, wherein the PLMN comprises a home PLMN (HPLMN) or an equivalent HPLMN (EHPLMN) among a plurality of PLMNs stored in the subscriber identification module.

9. The electronic device of claim 1, wherein the one or more instructions, which when executed by the processor, cause the electronic device to:
search for one or more cells through the frequency scanning, and
identify system information of the one or more found cells from the search.

10. The electronic device of claim 9, wherein the one or more instructions, which when executed by the processor, cause the electronic device to:
connect to a 5$^{th}$ generation (5G) core through the one or more found cells by using the first wireless communication circuit, based on the system information of the one or more found cells indicating that a core of the one or more found cell is the 5G core.

11. A frequency scanning method of an electronic device, the method comprising:
obtaining access technology identifier (ATI) information associated with one public land mobile network (PLMN) from a subscriber identification module of the electronic device; and
based on the ATI information indicating a next generation radio access network (NG-RAN), performing frequency scanning based on a first radio access technology (RAT) associated with a long term evolution (LTE) or based on a second RAT associated with a new radio (NR) according to an RAT priority.

12. The method of claim 11,
wherein the ATI information includes a bit string of a 8-bit length, and
wherein a value of a fourth least significant bit (LSB) of the ATI information indicates the NG-RAN.

13. The method of claim 11, further comprising:
based on the ATI information indicating an evolved universal mobile terrestrial radio access network (E-UTRAN), performing frequency scanning based on the first RAT.

14. The method of claim 11, wherein the performing the frequency scanning comprises:
performing a first frequency scanning based on the first RAT when a priority of the first RAT is higher than a priority of the second RAT.

15. The method of claim 14, wherein the performing the frequency scanning further comprises:
when the electronic device fails to find a cell from the first frequency scanning, performing a second frequency scanning based on the second RAT.

16. The method of claim 11, wherein the performing the frequency scanning comprises:
based on the ATI information indicating the NG-RAN, performing the frequency scanning based on the first RAT or the second RAT selectively according to the RAT priority; and
based on the ATI information indicating an evolved universal mobile terrestrial radio access network (E-UTRAN), performing the frequency scanning based on the first RAT.

17. The method of claim 11, wherein the PLMN comprises a PLMN having a highest priority from among a plurality of PLMNs stored in a subscriber identification module of the electronic device.

18. The method of claim 11, wherein the PLMN comprises a home PLMN (HPLMN) or an equivalent HPLMN (EHPLMN) among a plurality of PLMNs stored in a subscriber identification module of the electronic device.

19. The method of claim 11, further comprising:
searching for one or more cells through the frequency scanning; and
identifying system information of the one or more found cells from the search.

20. The method of claim 19, further comprising:
connecting to a 5$^{th}$ generation (5G) core through the one or more found cells based on the first RAT, based on the system information of the one or more found cells indicating that a core of the one or more found cell is the 5G core.

* * * * *